US012659900B2

(12) United States Patent　　(10) Patent No.:　US 12,659,900 B2
Yu et al.　　(45) Date of Patent:　Jun. 16, 2026

(54) METHOD AND DEVICE USED IN COMMUNICATION NODE FOR WIRELESS COMMUNICATION

(71) Applicant: APOGEE NETWORKS, LLC, Dallas, TX (US)

(72) Inventors: Qiaoling Yu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 71 days.

(21) Appl. No.: 18/132,983

(22) Filed: Apr. 11, 2023

(65) Prior Publication Data

US 2023/0328673 A1　　Oct. 12, 2023

(30) Foreign Application Priority Data

Apr. 11, 2022　(CN) ........................ 202210371747.2

(51) Int. Cl.
　　*H04W 56/00*　　(2009.01)
　　*H04L 1/1829*　　(2023.01)
(52) U.S. Cl.
　　CPC ....... *H04W 56/0045* (2013.01); *H04L 1/1835* (2013.01)
(58) Field of Classification Search
　　CPC .......... H04W 56/0045; H04W 56/004; H04W 56/001; H04W 56/005; H04L 1/1835; H04L 1/1829; H04L 1/1867; H04L 1/1874
　　See application file for complete search history.

(56) References Cited

U.S. PATENT DOCUMENTS 10,694,489 B2　6/2020　Johansson et al.
2018/0351661 A1*　12/2018　Briggs ................... H04B 17/18
(Continued)

FOREIGN PATENT DOCUMENTS

CN　　112911697 A　　6/2021
CN　　113508624 A　　10/2021
WO　　2020191745 A1　　10/2020

OTHER PUBLICATIONS

Third Generation Partnership Project, "Technical Specification Group Radio Access Network; NR; Physical channels and modulation (Release 17)," 3GPP TS 38.211 V17.1.0 (Dec. 2022).
(Continued)

*Primary Examiner* — Phong La
(74) *Attorney, Agent, or Firm* — Volpe Koenig

(57) ABSTRACT

Present application provides a method and a device used in communication node for wireless communications. A communication node receives a first signaling, the first signaling being used to determine a first TA, determines an uplink transmission timing for a first resource group according to at least the first TA, and starts or restarts a first timer, where a running status of the first timer is used to determine whether uplinks associated with the first resource group are aligned; receives a second signaling, the second signaling being used to determine a second TA, determines an uplink transmission timing for a second resource group according to at least the first TA and the second TA; the first resource group and the second resource group are both associated with a first cell; the first resource group comprises at least one radio resource; the second resource group comprises at least one radio resource.

17 Claims, 5 Drawing Sheets

(56)  References Cited

U.S. PATENT DOCUMENTS

| | | | |
|---|---|---|---|
| 2020/0351730 A1* | 11/2020 | Park | H04W 36/0077 |
| 2021/0195674 A1* | 6/2021 | Park | H04W 76/18 |
| 2021/0337625 A1* | 10/2021 | Tsai | H04W 76/27 |
| 2022/0225369 A1* | 7/2022 | Park | H04W 72/1273 |
| 2022/0256484 A1* | 8/2022 | Xu | H04W 56/001 |
| 2023/0137523 A1* | 5/2023 | Babaei | H04L 1/1887 |
| | | | 370/329 |
| 2023/0189345 A1* | 6/2023 | Khoshkholgh Dashtaki | |
| | | | H04B 7/1853 |
| | | | 370/329 |
| 2023/0284287 A1* | 9/2023 | Kung | H04W 56/001 |
| | | | 370/329 |
| 2023/0328673 A1* | 10/2023 | Yu | H04L 1/1835 |
| 2023/0376704 A1* | 11/2023 | Lu | G06K 7/10108 |
| 2024/0414674 A1* | 12/2024 | Xu | H04W 74/0833 |

OTHER PUBLICATIONS

Third Generation Partnership Project, "Technical Specification Group Radio Access Network; NR; Multiplexing and channel coding (Release 17)," 3GPP TS 38.212 V17.1.0 (Mar. 2022).

Third Generation Partnership Project, "Technical Specification Group Radio Access Network; NR; Physical layer procedures for data (Release 17)," 3GPP TS 38.214 V17.1.0 (Mar. 2022).

Third Generation Partnership Project, "Technical Specification Group Radio Access Network; NR; NR and NG-RAN Overall Description; Stage 2 (Release 16)," 3GPP TS 38.300 V16.8.0 (Dec. 2021).

Lenovo, "Enhancement of TA for UL transmission in M-DCI based M-TRP operation," 3GPP TSG RAN WG1#109-e, R1-2204163, e-Meeting (May 9-20, 2022).

Spreadtrum Communications, "Discussion on two TAs for multi-DCI based M-TRP operation," 3GPP TSG RAN WG1#109-e, R1-2203321, e-Meeting (May 9-20, 2022).

* cited by examiner

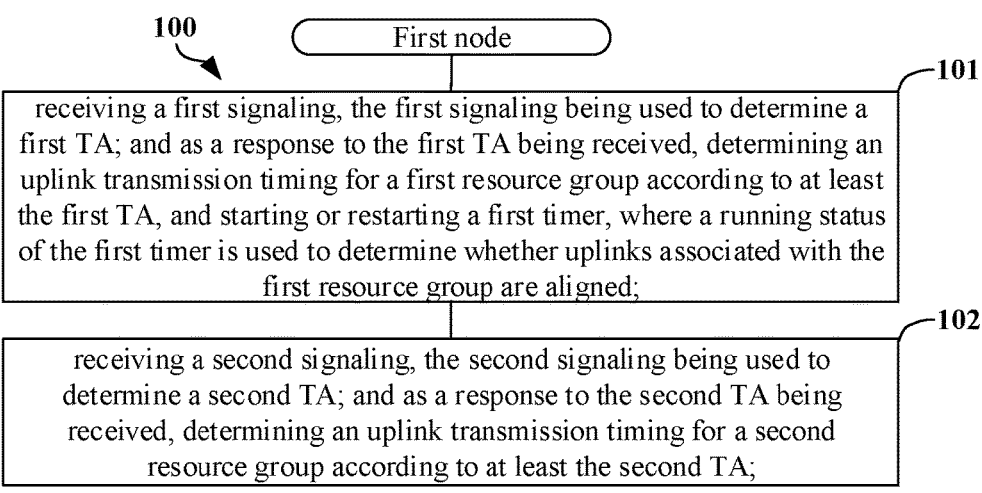

100

First node receiving a first signaling, the first signaling being used to determine a first TA; and as a response to the first TA being received, determining an uplink transmission timing for a first resource group according to at least the first TA, and starting or restarting a first timer, where a running status of the first timer is used to determine whether uplinks associated with the first resource group are aligned; — 101 receiving a second signaling, the second signaling being used to determine a second TA; and as a response to the second TA being received, determining an uplink transmission timing for a second resource group according to at least the second TA; — 102

FIG. 1

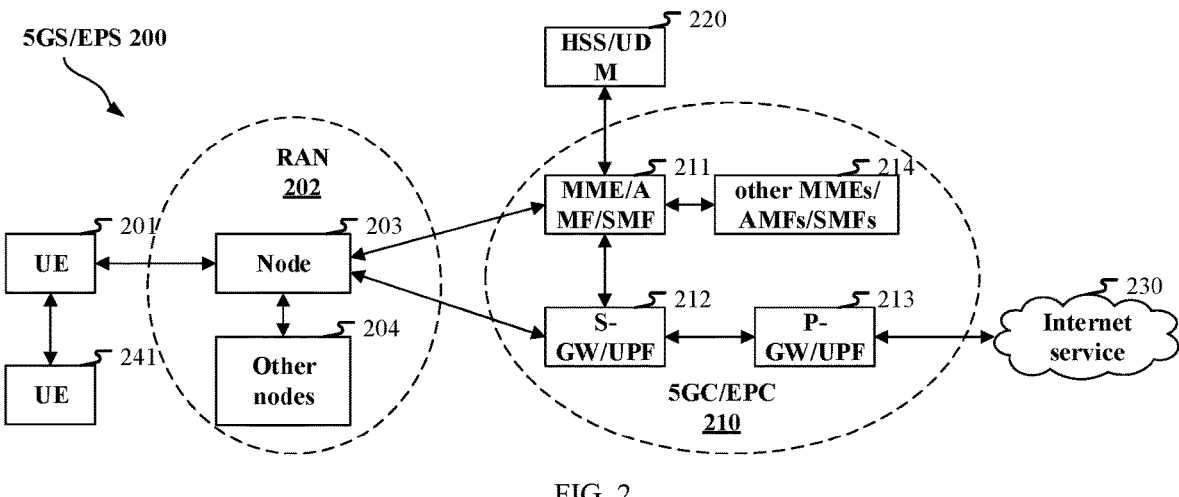

FIG. 2

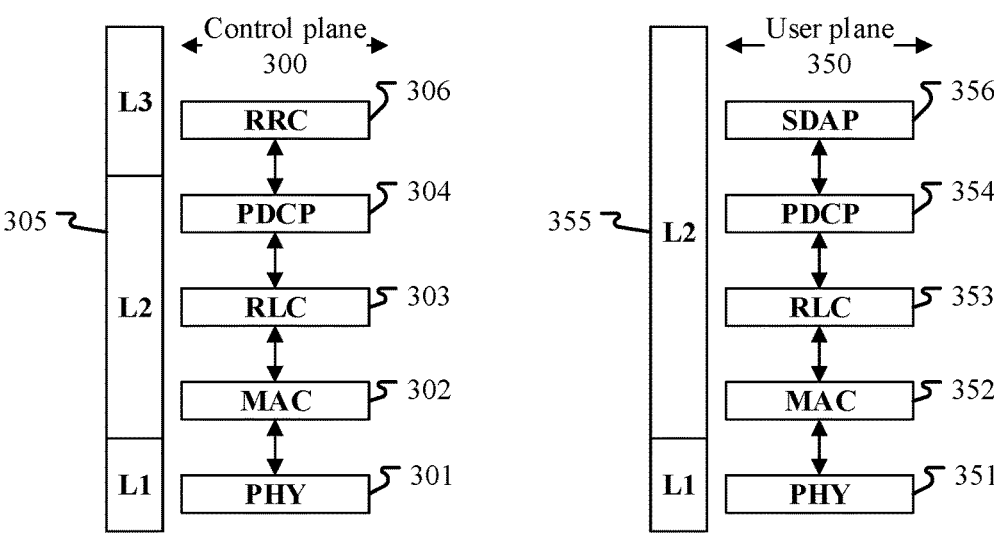

FIG. 3

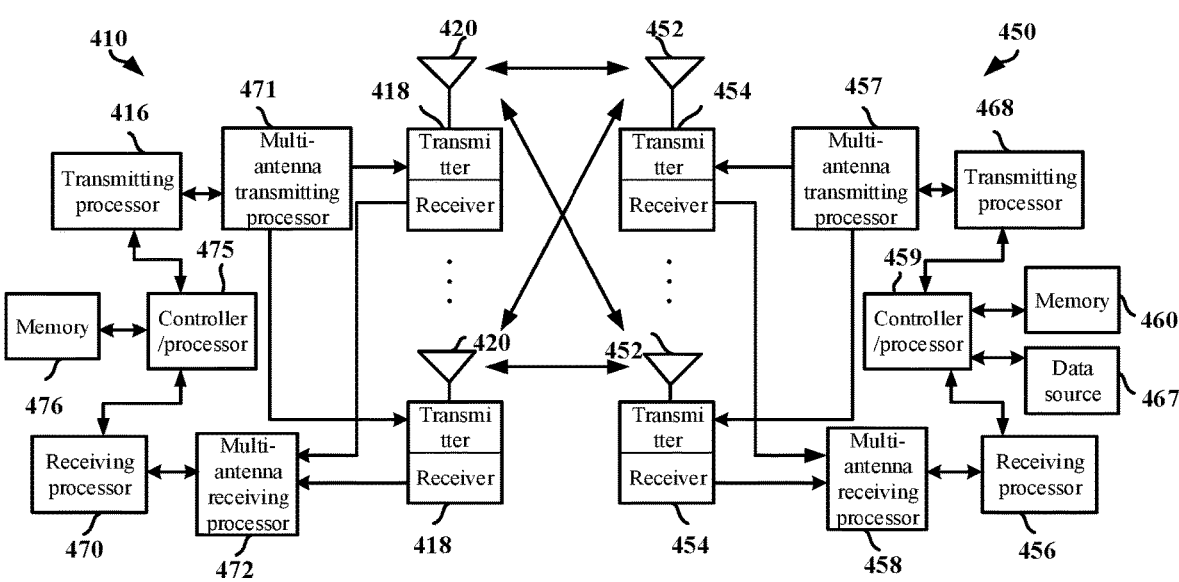

FIG. 4

First node U01 | Second node N02

S5201.transmitting first signaling

←————————first signaling————————

S5101.receiving first signaling

S5102.determining uplink transmission timing for first resource group according to at least first TA S5103.starting or restarting first timer S5202.transmitting second signaling ←————————second signaling————————

S5104.receiving second signaling

S5105.determining uplink transmission timing for second resource group according to at least second TA S5106.starting or restarting first timer End　　　　End

FIG. 5

First node U01

S6101.first timer being expired

S6102.executing first action set

End

FIG. 6

METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202210371747.2, filed on Apr. 11, 2022, the full disclosure of which is incorporated herein by reference.

BACKGROUND

Technical Field

The present application relates to transmission methods and devices in wireless communication systems, and in particular to a method and device for Multiple Input Multiple Output (MIMO) transmission in a wireless communication system.

Related Art

MIMO is a key technique of the New Radio (NR) system, which has been successfully commercialized. In Release (Rel)-15/16/17, the 3rd Generation Partner Project (3GPP) has worked on the standardization of Frequency Division Duplex (FDD) and Time Division Duplex (TDD) systems after studying the properties of MIMO, where the focus of studies is for Downlink (DL) MIMO operations. Targeting the Uplink (UL) MIMO, which is considered as a key direction of studies of 3GPP in Rel-18, the 3GPP RAN94e conference has decided on the conduction of the study item of "MIMO Evolution for Downlink and Uplink". Herein, a further study is required for the provision of additional uplink multiple Transmit/Receive Point (multi-TRP) deployment with enhanced uplink performance by providing two Timing Advances (TAs) and enhanced uplink power control.

SUMMARY

In the existing protocols, a Cell Group (CG) of a User Equipment (UE) can be configured with multiple Timing Advance Groups (TAGs), where each cell in the CG is configured with a TAG, and each TAG can determine whether uplinks of all cells in this TAG are aligned via a timeAlignmentTimer; when a timeAlignmentTimer is expired, the expiration will trigger operations for all cells within a TAG associated with the timeAlignmentTimer or for all cells within a CG to which a TAG associated with the timeAlignmentTimer belongs. If the UE performs uplink transmissions through two Transmit/Receive Points (TRPs) with different Timing Advances (TAs), it would be hard to adjust TAs for uplinks of respective TRPs with the current TA maintenance mechanism. Therefore, how to get TA for the uplink of each TRP maintained needs to be enhanced.

To address the above problem, the present application provides a solution to the maintenance of the TA for the uplink of each TRP. The present application only took MIMO scenarios for example in the statement above, though; it is also applicable to scenarios like Multi-Connection or Carrier Aggregation (CA), where similar technical effects can be achieved. Further, though originally targeted at the Uu air interface, the present application also applies to the PC5 interface. Further, the present application is designed targeting terminal-base station scenario, but can be extended to Vehicle-to-Everything (V2X), terminal-relay communications, as well as relay-base station communications, where similar technical effects can be achieved. Further, the present application is designed targeting terminal-base station scenario, but can be extended to Integrated Access and Backhaul (IAB) communications, where similar technical effects can be achieved. Further, the present application is designed targeting Non-Terrestrial Network (NTN) scenarios, but can be extended to Terrestrial Network (TN) communications, where similar technical effects can be achieved. Additionally, the adoption of a unified solution for various scenarios contributes to the reduction of hardcore complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first signaling, the first signaling being used to determine a first Timing Advance (TA); and receiving a second signaling, the second signaling being used to determine a second TA; and as a response to the first signaling being received, determining an uplink transmission timing for a first resource group according to at least the first TA, and starting or restarting a first timer, where a running status of the first timer is used to determine whether uplinks associated with the first resource group are aligned; and as a response to the second signaling being received, determining an uplink transmission timing for a second resource group according to at least the first TA and the second TA;

herein, the first resource group and the second resource group are both associated with a first cell; the first resource group comprises at least one radio resource; the second resource group comprises at least one radio resource; any radio resource in the first resource group is different from any radio resource in the second resource group.

In one embodiment, a problem to be solved in the present application includes: how to get TA for the uplink of each TRP maintained.

In one embodiment, a problem to be solved in the present application includes: how to shorten the uplink transmission delay.

In one embodiment, a problem to be solved in the present application includes: how to prevent the waste of resources.

In one embodiment, a problem to be solved in the present application includes: how to determine uplink transmission timings of two TRPs associated within a same cell respectively.

In one embodiment, the action of determining an uplink transmission timing for a second resource group according to at least the second TA comprises: determining an uplink transmission timing for a second resource group according to at least the first TA and the second TA.

In one embodiment, characteristics of the above method include: at least the first TA and the second TA are used for determining an uplink transmission timing for the second resource group.

In one embodiment, characteristics of the above method include: an uplink transmission timing for the second resource group is related to both the first TA and the second TA.

In one embodiment, characteristics of the above method include: an uplink transmission timing for the second resource group is related to an uplink transmission timing for the first resource group.

In one embodiment, characteristics of the above method include: an uplink transmission timing for the second resource group refers back to an uplink transmission timing for the first resource group.

In one embodiment, an advantage of the above method includes: ensuring the maintenance of TAs for uplinks of multiple resource groups associated with a cell.

In one embodiment, an advantage of the above method includes: better ensuring the backward compatibility and forward compatibility of standard implementation.

In one embodiment, an advantage of the above method includes: reducing the impact on the criterion.

In one embodiment, an advantage of the above method includes: it is up to the network to determine uplink transmission timings of two TRPs associated within a same cell respectively.

In one embodiment, the action of determining an uplink transmission timing for a second resource group according to at least the second TA comprises: determining an uplink transmission timing for a second resource group according to at least the second TA; an uplink transmission timing for the second resource group is unrelated to the first TA.

In one embodiment, characteristics of the above method include: the first TA not being used for determining an uplink transmission timing for the second resource group.

In one embodiment, an advantage of the above method includes: ensuring flexible adjustment of an uplink transmission timing for the second resource group and an uplink transmission timing for the first resource group.

According to one aspect of the present application, characterized in that the second signaling comprises a first field, the first field being used to indicate the first cell.

According to one aspect of the present application, characterized in that the second signaling comprises a second field, the second field being used to indicate the second resource group.

According to one aspect of the present application, characterized in that the second signaling comprises a third field, the third field being used to determine whether the second TA is a positive number or a negative number.

According to one aspect of the present application, characterized in comprising:

receiving a third signaling, the third signaling being used to determine a target TAG set, the target TAG set comprising at least one TAG, where a first TAG is one TAG comprised in the target TAG set; the first TAG comprises the first resource group;

herein, the first TAG comprises the second resource group, or, any TAG in the target TAG set does not comprise the second resource group.

According to one aspect of the present application, characterized in comprising:

executing a first action set as a response to the first timer being expired.

In one embodiment, the first action set comprises at least one of flushing all Hybrid Automatic Repeat Request (HARQ) Buffers associated with the first cell, or, notifying a higher layer of releasing all first-type resources associated with the first cell, or, deleting all second-type resources associated with the first cell; the first-type resource comprises at least one of a Physical uplink control channel (PUCCH) or a Sounding Reference Signal (SRS); the second-type resource comprises at least one of a configured downlink assignment or a configured uplink grant or a Physical uplink shared channel (PUSCH) resource of a semi-persistent Channel state information (CSI) reporting.

In one embodiment, characteristics of the above method include: a running status of the first timer is used to determine whether uplinks associated with the first resource group are aligned, and the running status of the first timer is used to determine whether uplinks associated with the second resource group are aligned.

In one embodiment, the first action set comprises at least one of flushing all HARQ buffers associated with the first resource group, or, notifying a higher layer of releasing all first-type resources associated with the first resource group, or, deleting all second-type resources associated with the first resource group; the first-type resource comprises at least one of a PUCCH or an SRS; the second-type resource comprises at least one of a configured downlink assignment or a configured uplink grant or a PUSCH resource for semi-persistent CSI reporting.

In one embodiment, characteristics of the above method include: a running status of the first timer is used to determine whether uplinks associated with the first resource group are aligned.

In one embodiment, characteristics of the above method include: a running status of the first timer is not used to determine whether uplinks associated with the second resource group are aligned.

According to one aspect of the present application, characterized in comprising:

as a response to the second signaling being received, starting or restarting the first timer.

In one embodiment, characteristics of the above method include: a running status of the first timer is used to determine whether uplinks associated with the first resource group are aligned, and the running status of the first timer is used to determine whether uplinks associated with the second resource group are aligned.

According to one aspect of the present application, characterized in comprising:

transmitting at least a first radio signal according to an uplink transmission timing for the first resource group, where the first radio signal is a physical layer signal.

In one embodiment, characteristics of the above method include: the first radio signal is associated with the first resource group.

According to one aspect of the present application, characterized in comprising:

transmitting at least a second radio signal according to an uplink transmission timing for the second resource group, where the second radio signal is a physical layer signal.

In one embodiment, characteristics of the above method include: the second radio signal is associated with the second resource group.

The present application provides a method in a second node for wireless communications, comprising:

transmitting a first signaling, the first signaling being used to determine a first TA, and at least the first TA being used to determine an uplink transmission timing for a first resource group; and transmitting a second signaling, the second signaling being used to determine a second TA, and at least the first TA and the second TA being used to determine an uplink transmission timing for a second resource group;

herein, as a response to the first signaling being received, a first timer is started or restarted, and a running status of the first timer is used to determine whether uplinks associated with the first resource group are aligned; the first resource group and the second resource group are both associated with a first cell; the first resource group comprises at least one radio resource; the second resource group comprises at least one radio resource; any radio resource in the first resource group is different from any radio resource in the second resource group.

According to one aspect of the present application, characterized in that the second signaling comprises a first field, the first field being used to indicate the first cell.

According to one aspect of the present application, characterized in that the second signaling comprises a second field, the second field being used to indicate the second resource group.

According to one aspect of the present application, characterized in that the second signaling comprises a third field, the third field being used to determine whether the second TA is a positive number or a negative number.

According to one aspect of the present application, characterized in comprising:

transmitting a third signaling, the third signaling being used to determine a target TAG set, the target TAG set comprising at least one TAG, where a first TAG is one TAG comprised in the target TAG set;

herein, the first TAG comprises the first resource group; the first TAG comprises the second resource group, or, any TAG in the target TAG set does not comprise the second resource group.

According to one aspect of the present application, characterized in that as a response to the first timer being expired, a first action set is executed; the first action set comprises at least one of flushing all HARQ buffers associated with the first cell, or, notifying a higher layer of releasing all first-type resources associated with the first cell, or, deleting all second-type resources associated with the first cell; the first-type resource comprises at least one of a PUCCH or an SRS; the second-type resource comprises at least one of a configured downlink assignment or a configured uplink grant or a PUSCH resource for semi-persistent CSI reporting.

According to one aspect of the present application, characterized in that as a response to the second signaling being received, the first timer is started or restarted.

According to one aspect of the present application, characterized in comprising:

receiving at least a first radio signal, the first radio signal being a physical layer signal, and the first radio signal being transmitted according to an uplink transmission timing for the first resource group.

According to one aspect of the present application, characterized in comprising:

receiving at least a second radio signal, the second radio signal being a physical layer signal, and the second radio signal being transmitted according to an uplink transmission timing for the second resource group.

The present application provides a first node for wireless communications, comprising:

a first receiver, receiving a first signaling, the first signaling being used to determine a first Timing Advance (TA); and receiving a second signaling, the second signaling being used to determine a second TA; and a first transmitter, as a response to the first signaling being received, determining an uplink transmission timing for a first resource group according to at least the first TA, and starting or restarting a first timer, where a running status of the first timer is used to determine whether uplinks associated with the first resource group are aligned; and as a response to the second signaling being received, determining an uplink transmission timing for a second resource group according to at least the first TA and the second TA;

herein, the first resource group and the second resource group are both associated with a first cell; the first resource group comprises at least one radio resource; the second resource group comprises at least one radio resource; any radio resource in the first resource group is different from any radio resource in the second resource group.

The present application provides a second node for wireless communications, comprising:

a second transmitter, transmitting a first signaling, the first signaling being used to determine a first TA, and at least the first TA being used to determine an uplink transmission timing for a first resource group; and transmitting a second signaling, the second signaling being used to determine a second TA, and at least the first TA and the second TA being used to determine an uplink transmission timing for a second resource group;

herein, as a response to the first signaling being received, a first timer is started or restarted, and a running status of the first timer is used to determine whether uplinks associated with the first resource group are aligned; the first resource group and the second resource group are both associated with a first cell; the first resource group comprises at least one radio resource; the second resource group comprises at least one radio resource; any radio resource in the first resource group is different from any radio resource in the second resource group.

In one embodiment, compared with the prior art, the present application is advantageous in the following aspects:

getting TA for the uplink of each TRP maintained;

ensuring the maintenance of TAs for uplinks of multiple resource groups associated with a cell;

better ensuring the backward compatibility and forward compatibility of standard implementation;

reducing the impact on the criterion;

the network determining uplink transmission timings of two TRPs associated within a same cell respectively;

ensuring flexible adjustment of an uplink transmission timing for the second resource group and an uplink transmission timing for the first resource group.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of transmitting a first signaling and a second signaling according to one embodiment of the present application.

FIG. 2 illustrates a schematic diagram of a network architecture according to one embodiment of the present application.

FIG. 3 illustrates a schematic diagram of a radio protocol architecture of a user plane and a control plane according to one embodiment of the present application.

FIG. 4 illustrates a schematic diagram of a first communication device and a second communication device according to one embodiment of the present application.

FIG. 5 illustrates a flowchart of radio signal transmission according to one embodiment of the present application.

FIG. 6 illustrates a flowchart of radio signal transmission according to another embodiment of the present application.

DESCRIPTION OF THE EMBODIMENTS

Figure 7:
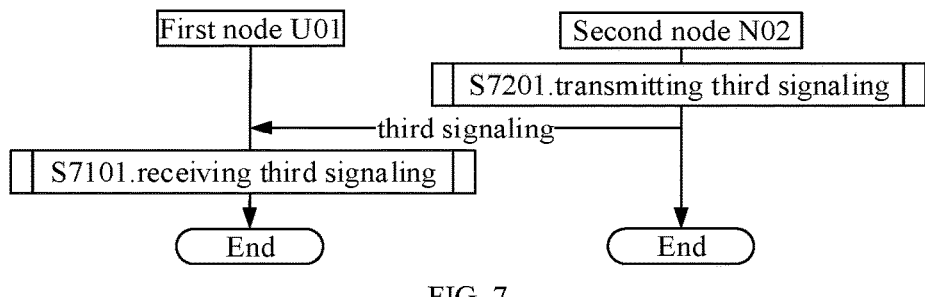
FIG. 7 illustrates a flowchart of radio signal transmission according to a third embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of transmitting a first signaling and a second signaling according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, a first node in the present application receives a first signaling in step 101, the first signaling being used to determine a first TA; as a response to the first signaling being received, determines an uplink transmission timing for a first resource group according to at least the first TA, and starts or restarts a first timer, where a running status of the first timer is used to determine whether uplinks associated with the first resource group are aligned; receives a second signaling in step 102, the second signaling being used to determine a second TA; and as a response to the second signaling being received, determines an uplink transmission timing for a second resource group according to at least the second TA; herein, the first resource group and the second resource group are both associated with a first cell; the first resource group comprises at least one radio resource; the second resource group comprises at least one radio resource; any radio resource in the first resource group is different from any radio resource in the second resource group.

In one embodiment, the action of determining an uplink transmission timing for a second resource group according to at least the second TA comprises: determining an uplink transmission timing for a second resource group according to at least the first TA and the second TA.

In one embodiment, the action of determining an uplink transmission timing for a second resource group according to at least the second TA comprises: determining an uplink transmission timing for a second resource group according to at least the second TA; an uplink transmission timing for the second resource group is unrelated to the first TA.

In one subembodiment, the first TA is not used for determining an uplink transmission timing for the second resource group.

In one embodiment, an uplink transmission timing of the first resource group is unrelated to the second TA.

In one subembodiment, the second TA is not used for determining an uplink transmission timing for the first resource group.

In one embodiment, an uplink transmission timing of the first resource group is related to the second TA.

In one subembodiment, the second TA is used for determining an uplink transmission timing for the first resource group.

In one embodiment, the phrase "determining an uplink transmission timing for a first resource group" can be replaced by: determining a first $T_{TA}$.

In one embodiment, the phrase that "determining an uplink transmission timing for a second resource group" can be replaced by: determining a second $T_{TA}$.

In one embodiment, an uplink transmission timing for the first resource group comprises: an uplink transmission timing for the first resource group compared with a downlink reception timing observed by the UE.

In one embodiment, the second TA is related to the second resource group, and, the second TA is unrelated to the first resource group.

In one embodiment, the first TA is related to the first resource group, and, the first TA is unrelated to the second resource group.

In one embodiment, a transmitter of the first signaling is a maintenance base station for the first cell.

In one embodiment, a transmitter for the first signaling is a maintenance base station for a serving cell of the first node.

In one embodiment, a transmitter of the first signaling is a maintenance base station for the first cell.

In one embodiment, a transmitter of the first signaling is a maintenance base station for a cell in the first cell group.

In one embodiment, a transmitter of the first signaling is a maintenance base station for an additional cell of a serving cell of the first node.

In one embodiment, the first signaling is used by the first node to determine the first TA.

In one embodiment, the first signaling is used by the first node to calculate the first TA.

In one embodiment, the first signaling comprises a Medium Access Control (MAC) layer signaling.

In one embodiment, the first signaling comprises at least one MAC Protocol Data Unit (PDU).

In one embodiment, the first signaling comprises at least one MAC subPDU.

In one embodiment, the first signaling comprises at least one MAC subheader.

In one embodiment, the first signaling comprises a physical-layer signaling.

In one embodiment, the first signaling comprises at least one MAC Control Element (CE).

In one embodiment, the first signaling is used for calculating the first TA.

In one embodiment, the first signaling indicates an index of the first TA.

In one embodiment, the first signaling indicates an index of an adjustment value of the first TA.

In one embodiment, a field in the first signaling is used to determine the first TA.

In one embodiment, the first signaling comprises a first MAC Field, the first MAC Field being used to determine the first TA.

In one embodiment, the first signaling comprises a first MAC Field, the first MAC Field indicating a first TA.

In one embodiment, an index of the first TA is a non-negative integer.

In one embodiment, an index of the first TA is a $T_A$ value.

In one embodiment, the first signaling indicates a first $T_A$, the first $T_A$ being used to determine the first TA.

In one embodiment, the first signaling indicates a first $T_A$, at least the first $T_A$ being used to determine an uplink transmission timing for the first resource group.

In one embodiment, the first signaling indicates a first $T_A$, the first $T_A$ being an index value of the first TA.

In one embodiment, the first signaling indicates a first $T_A$, the first $T_A$ being used to determine the first TA.

In one subembodiment, the first $T_A$ is an index.

In one subembodiment, the first $T_A$ is an integer.

In one embodiment, the first $T_A$ is a non-negative integer.

In one embodiment, the first $T_A$ is a positive integer.

In one embodiment, the first $T_A$ is no less than 0 and no greater than M2, M2 being a positive integer.

In one embodiment, M2 is equal to 3846.

In one embodiment, M2 is equal to 63.

In one embodiment, the first signaling comprises a first MAC Field, the first MAC Field indicating a first $T_A$.

In one embodiment, the first MAC field comprises a positive integer number of bit(s).

In one embodiment, the first MAC field comprises 5 bits.

In one embodiment, the first MAC field comprises 6 bits.

In one embodiment, the first MAC field comprises 11 bits.

In one embodiment, the first MAC field comprises 12 bits.

In one embodiment, the first MAC field is a Timing Advance Command field.

In one embodiment, the first MAC field is a TA Command field.

In one embodiment, names of the first MAC field include at least one of Timing or Advance or TA or Command.

In one embodiment, the first signaling is a Timing Advance Command MAC CE.

In one embodiment, the first signaling is an Absolute Timing Advance Command MAC CE.

In one embodiment, the first signaling is a first Random Access Response (RAR).

In one embodiment, the first RAR is received by listening over a PDCCH scrambled by a Random Access RNTI (Radio Network Temporary Identifier (RA-RNTI).

In one embodiment, the first RAR is a MAC RAR for a 4-step random access procedure.

In one embodiment, the first RAR is received by listening over a PDCCH scrambled by a MSGB-RNTI.

In one embodiment, the first RAR is a fallbackRAR for a 2-step random access procedure.

In one embodiment, the first RAR is a successRAR for a 2-step random access procedure.

In one embodiment, the first RAR is an Absolute Timing Advance Command MAC CE.

In one embodiment, the first RAR is a DCI.

In one embodiment, the first signaling comprises the first MAC field, and the first signaling comprises a second MAC field, the second MAC field being used to determine a TAG.

In one subembodiment, the second MAC field is used to determine a TAG to which the first TA comprised in the first MAC field belongs.

In one subembodiment, the second MAC field indicates an index of a TAG to which the first resource group belongs.

In one subembodiment, the second MAC field indicates an identifier of a TAG to which the first resource group belongs.

In one subembodiment, the second MAC field indicates a TAG-Id associated with the first resource group.

In one embodiment, the first signaling comprises the first MAC field, and the first signaling does not comprise the second MAC field.

In one embodiment, the first $T_A$ is a $N_{TA}$.

In one embodiment, the first TA is related to the first $T_A$.

In one embodiment, the first TA is related to the first $T_A$ and the first value.

In one embodiment, the first TA is related to the first $T_A$ and the first maintenance $N_{TA}$.

In one embodiment, the first TA is related to the first $T_A$, the first value and the first maintenance $N_{TA}$.

In one embodiment, the first $T_A$ and the first value are used to determine the first $T_A$.

In one embodiment, the first $T_A$, the first value and the first maintenance $N_{TA}$ are used to determine the first $T_A$.

In one embodiment, the first TA is equal to a product of the first $T_A$ and the first value.

In one embodiment, the first TA is equal to ((the first $T_A$·first value)+the first maintenance $N_{TA}$).

In one embodiment, the first TA is equal to (((the first $T_A$−M1)·first value)+the first maintenance $N_{TA}$).

In one embodiment, the first $T_A$=the first $T_A$·first value.

In one embodiment, the first $T_A$=the first maintenance $N_{TA}$+(the first $T_A$−M1)·first value.

In one embodiment, M1 is a positive integer, and M2 is a positive integer, where M1 is less than M2.

In one embodiment, M1 is equal to 31, and M2 is equal to 63.

In one embodiment, M1 is equal to 15, and M2 is equal to 31.

In one embodiment, M1=(M2−1)/2.

In one embodiment, the first maintenance $N_{TA}$ is a $N_{TA}$ maintained by the first node before the first signaling is received.

In one embodiment, before the first signaling is received, the first maintenance $N_{TA}$ is $N_{TA}$ of the first resource group.

In one embodiment, before the first signaling is received, the first maintenance $N_{TA}$ is used to determine an uplink transmission timing for the first resource group.

In one embodiment, before the first signaling is received, the first maintenance $N_{TA}$ is used to determine an uplink transmission timing for the first cell.

In one embodiment, before the first signaling is received, the first maintenance $N_{TA}$ is used to determine uplink transmission timings for the first resource group and the second resource group.

In one embodiment, if the first signaling is received in a random access procedure, the first maintenance $N_{TA}$ is not used to determine an uplink transmission timing for the first resource group.

In one embodiment, if the first signaling is not received in a random access procedure, the first maintenance $N_{TA}$ is used to determine an uplink transmission timing for the first resource group.

In one embodiment, the first value is related to a Subcarrier spacing (SCS).

In one embodiment, the first value is related to $\mu_1$, the $\mu_1$ being related to a Subcarrier spacing (SCS) associated with the first resource group, where the SCS associated with the first resource group is equal to $2^{\mu_1} \cdot 15$ kHz.

In one embodiment, the first value is $16 \cdot 64/2$ where $\mu_1$ is related to an SCS.

In one embodiment, the $\mu_1$ is related to an SCS.

In one embodiment, the $\mu_1$ is related to an SCS associated with the first resource group.

In one embodiment, the $\mu_1$ is a non-negative integer.

In one embodiment, the $\mu_1$ is an integer no less than 0 and no greater than 5.

In one embodiment, the second signaling comprises a MAC subheader, the MAC subheader comprising one eLCID.

In one embodiment, the second signaling comprises an index of a TAG.

In one embodiment, the second signaling does not comprise an index of any TAG.

In one embodiment, the second signaling comprises a physical-layer signaling.

In one embodiment, the second signaling is a DCI, where a field in the DCI indicates the second TA.

In one embodiment, a transmitter of the second signaling is a maintenance base station for the first cell.

In one embodiment, a transmitter of the second signaling is a maintenance base station for a serving cell of the first node.

In one embodiment, a transmitter of the second signaling is a maintenance base station for the first cell.

In one embodiment, a transmitter of the second signaling is a maintenance base station for a cell in the first cell group.

In one embodiment, a transmitter of the second signaling is a maintenance base station for an additional cell of a serving cell of the first node.

In one embodiment, the second signaling is used by the first node to determine the second TA.

In one embodiment, the second signaling is used by the first node to calculate the second TA.

In one embodiment, the second signaling comprises a MAC layer signaling.

In one embodiment, the second signaling comprises at least one MAC PDU.

In one embodiment, the second signaling comprises at least one MAC subPDU.

In one embodiment, the second signaling comprises at least one MAC subheader.

In one embodiment, the second signaling comprises a physical-layer signaling.

In one embodiment, the second signaling comprises at least one MAC CE.

In one embodiment, the second signaling is used for calculating the second TA.

In one embodiment, the second signaling indicates an index of the second TA.

In one embodiment, the second signaling indicates an index of an adjustment value of the second TA.

In one embodiment, a field in the second signaling is used to determine the second TA.

In one embodiment, the second signaling comprises at least one MAC CE.

In one embodiment, the second signaling comprises a given field, the given field being used to determine the second TA.

In one embodiment, the second signaling comprises a given field, the given field indicating the second $T_A$.

In one embodiment, an index of the second TA is a non-negative integer.

In one embodiment, an index of the second TA is a $T_A$ value.

In one embodiment, the second signaling indicates a second $T_A$, the second $T_A$ being used to determine the second TA.

In one embodiment, the second signaling indicates a second $T_A$, at least the second $T_A$ being used to determine an uplink transmission timing for the second resource group.

In one embodiment, the second signaling indicates a second $T_A$, the second $T_A$ being an index value of the second TA.

In one embodiment, the first signaling indicates a second $T_A$, the second $T_A$ being used to determine the second TA.

In one embodiment, the second $T_A$ is used to determine the second TA.

In one embodiment, the second $T_A$ is used to calculate a difference between the first $N_{TA}$ and the second $N_{TA}$.

In one embodiment, a product of (the second $T_A \cdot$ the second value) is equal to a difference of (the first TA–the second TA).

In one embodiment, the second $T_A$ is an index.

In one embodiment, the second $T_A$ is an integer.

In one embodiment, the second $T_A$ is a non-negative integer.

In one embodiment, the second $T_A$ is a positive integer.

In one embodiment, the second $T_A$ is no less than 0 and no greater than W2, W2 being a positive integer.

In one embodiment, the second $T_A$ is no less than 1 and no greater than W2, W2 being a positive integer.

In one embodiment, W2 is equal to 3846.

In one embodiment, W2 is equal to 64.

In one embodiment, W2 is equal to 63.

In one embodiment, W2 is equal to 32.

In one embodiment, W2 is equal to 31.

In one embodiment, the given field comprises a positive integer number of bit(s).

In one embodiment, a bit size (number of bits) comprised in the given field is equal to 6.

In one embodiment, a bit size (number of bits) comprised in the given field is less than 6.

In one embodiment, the given field comprises 3 bits.

In one embodiment, the given field comprises 4 bits.

In one embodiment, the given field comprises 5 bits.

In one embodiment, a bit size (number of bits) comprised in the given field is equal to 12.

In one embodiment, a bit size (number of bits) comprised in the given field is less than 12.

In one embodiment, the given field comprises 11 bits.

In one embodiment, the given field comprises 10 bits.

In one embodiment, the given field is a Timing Advance Command field.

In one embodiment, the given field is a TA Command field.

In one embodiment, names of the given field include at least one of Timing or Advance or TA or Command.

In one embodiment, the second signaling is a Timing Advance Command MAC CE.

In one embodiment, the second signaling is an Absolute Timing Advance Command MAC CE.

In one embodiment, the second signaling is a second random access response (RAR).

In one embodiment, the second RAR is received by listening over a PDCCH scrambled by a RA-RNTI.

In one embodiment, the second RAR is a MAC RAR for a 4-step random access procedure.

In one embodiment, the second RAR is received by listening over a PDCCH scrambled by a MSGB-RNTI.

In one embodiment, the second RAR is a fallbackRAR for a 2-step random access procedure.

In one embodiment, the second RAR is a success AR for a 2-step random access procedure.

In one embodiment, the second RAR is an Absolute Timing Advance Command MAC CE.

In one embodiment, the second RAR is a DCI.

In one embodiment, the second signaling comprises the given field, and the second signaling comprises a third MAC field, the third MAC field being used to determine a TAG.

In one subembodiment, the third MAC field is used to determine a TAG to which the second TA comprised in the given field belongs.

In one subembodiment, the third MAC field indicates an index of a TAG to which the second resource group belongs.

In one subembodiment, the third MAC field indicates an identifier of a TAG to which the second resource group belongs.

In one subembodiment, the third MAC field indicates a TAG-Id associated with the second resource group.

In one embodiment, the second signaling comprises the given field, and the second signaling does not comprise the given field.

In one embodiment, the second TA is an offset.

In one embodiment, the second TA is used to determine a difference between an uplink transmission timing for the first resource group and an uplink transmission timing for the second resource group.

In one subembodiment, the second TA is a positive number.

In one subembodiment, the second TA is a negative number.

In one subembodiment, the second TA is a positive number or a negative number.

In one subembodiment, the second TA is used to determine a time interval that an uplink transmission timing for the second resource group is advanced or deferred by compared with an uplink transmission timing for the first resource group.

In one subembodiment, whether a difference between an uplink transmission timing for the first resource group and an uplink transmission timing for the second resource group is a positive number or a negative number is used to determine whether an uplink transmission timing for the second resource group is advanced by the difference or deferred by the difference compared with an uplink transmission timing for the first resource group.

In one subembodiment, whether a difference between an uplink transmission timing for the first resource group and an uplink transmission timing for the second resource group is a positive number or a negative number is used to determine whether an uplink transmission timing for the second resource group is deferred by the difference or advanced by the difference compared with an uplink transmission timing for the first resource group.

In one embodiment, the second TA is an absolute timing advance.

In one embodiment, the second TA is an adjustment value of a timing advance.

In one embodiment, the second TA is an adjustment value for a reference timing advance TA).

In one subembodiment, the reference TA is related to the first resource group.

In one subembodiment, the reference TA is related to the second resource group.

In one subembodiment, the reference TA is related to the first cell.

In one subembodiment, the reference TA is the first TA.

In one subembodiment, the reference TA is a sum of the first TA and the first offset.

In one subembodiment, the reference TA is a sum of the first TA, the first maintenance $N_{TA}$ and the first offset.

In one subembodiment, the reference TA is the first maintenance $N_{TA}$.

In one subembodiment, the reference TA is the second maintenance $N_{TA}$.

In one subembodiment, the reference TA is a sum of the second maintenance $N_{TA}$ and the first offset.

In one embodiment, the second TA is related to the second $T_A$.

In one embodiment, the second TA is related to the second $T_A$ and a second value.

In one embodiment, the second $T_A$ and the second value are used to determine the second TA.

In one embodiment, the second $T_A$ is related to the second $T_A$ and a second maintenance $N_{TA}$.

In one embodiment, the second TA is related to the second $T_A$, a second value and a second maintenance $N_{TA}$.

In one embodiment, the second $T_A$, a second value and a second maintenance $N_{TA}$ are used to determine the second TA.

In one embodiment, the second TA is related to the second $T_A$ and the first $T_A$.

In one embodiment, the second TA is related to the second $T_A$, a second value, the first $T_A$ and the first value.

In one embodiment, the second TA is related to the second $T_A$ and the first TA.

In one embodiment, the second TA is related to the second $T_A$, a second value and the first TA.

In one embodiment, the second value is the first value.

In one embodiment, the second value is not the first value.

In one embodiment, the second value is related to an SCS.

In one embodiment, the second value is related to $\mu_2$, $\mu_2$ being related to an SCS associated with the second resource group, where the SCS associated with the second resource group is equal to $2^{\mu_{12}} \cdot 15$ kHz.

In one embodiment, the second value is $16 \cdot 64/2^{\mu_2}$, where the $\mu_2$ is related to an SCS.

In one embodiment, the $\mu_2$ is related to an SCS.

In one embodiment, the $\mu_2$ is related to an SCS associated with the second resource group.

In one embodiment, the $\mu_2$ is a non-negative integer.

In one embodiment, the $\mu_2$ is an integer no less than 0 and no greater than 5.

In one embodiment, the $\mu_1$ and the $\mu_2$ are the same.

In one embodiment, the $\mu_1$ and the $\mu_2$ are different.

In one embodiment, the second TA is equal to (the second $T_A$·second value).

In one embodiment, the second TA is equal to (second maintenance $N_{TA}$+(the second $T_A$–W1)·second value).

In one embodiment, the second TA is equal to (second maintenance $N_{TA}$+the second $T_A$·second value), or, the second TA is equal to (second maintenance $N_{TA}$–the second $T_A$·second value).

In one embodiment, the second TA is equal to (the first TA+the second $T_A$·second value), or, the second $T_A$ is equal to (the first $T_A$–the second $T_A$·second value).

In one embodiment, the second TA is equal to (the first $T_A$·first value+the second $T_A$·second value), or, the second TA is equal to (the first $T_A$·first value–the second $T_A$·second value).

In one embodiment, a field in the second signaling or a field in an RRC message is used to determine whether (the second $T_A$·second value) is a positive number or a negative number.

In one embodiment, a field in the second signaling or a field in an RRC message is used to determine an operation mode of (the second $T_A$·second value).

In one embodiment, a field in the second signaling or a field in an RRC message is used to determine that the second TA is equal to (second maintenance $N_{TA}$+the second $T_A$·second value), or, the second TA is equal to (second maintenance $N_{TA}$–the second $T_A$·second value).

In one embodiment, a field in the second signaling or a field in an RRC message is used to determine that the second TA is equal to (the first TA+the second $T_A$·second value), or, the second TA is equal to (the first TA–the second $T_A$·second value).

In one embodiment, a field in the second signaling or a field in an RRC message is used to determine that the second TA is equal to (the first $T_A$·first value+the second $T_A$·second value), or, the second TA is equal to (the first $T_A$·first value–the second $T_A$·second value).

In one embodiment, the second TA=the second $T_A$·second value.

In one embodiment, the second TA=second maintenance $N_{TA}$+(the second $T_A$–W1) second value.

In one embodiment, the second TA=(the first $T_A$+the second $T_A$·second value).

In one embodiment, the second TA=(the first $T_A$·first value+the second $T_A$·second value).

In one embodiment, W1 is a positive integer, and W2 is a positive integer, where W1 is less than W2.

In one embodiment, W1 is equal to 31, and W2 is equal to 63.

In one embodiment, W1 is equal to 15, and W2 is equal to 31.

In one embodiment, W1=(W2–1)/2.

In one embodiment, W1 is equal to M1.

In one embodiment, W1 is unequal to M1.

In one embodiment, W2 is equal to M2.

In one embodiment, W2 is unequal to M2.

In one embodiment, M1 is equal to 31, and M2 is equal to 63; W1 is equal to 15, and W2 is equal to 31.

In one embodiment, the second signaling is not received in a random access procedure.

In one embodiment, the second maintenance $N_{TA}$ is the first maintenance $N_{TA}$.

In one embodiment, the second maintenance $N_{TA}$ is not the first maintenance $N_{TA}$.

In one subembodiment, the second maintenance $N_{TA}$ is a $N_{TA}$ maintained by the first node before the second signaling is received.

In one subembodiment, before the second signaling is received, the second maintenance $N_{TA}$ is a $N_{TA}$ of the second resource group.

In one subembodiment, before the second signaling is received, the second maintenance $N_{TA}$ is used to determine an uplink transmission timing for the second resource group.

In one embodiment, the first signaling and the second signaling do not belong to a same MAC CE, and, the first signaling and the second signaling do not belong to a same RAR.

In one embodiment, the first signaling and the second signaling belong to a same MAC CE.

In one embodiment, the first signaling and the second signaling belong to a same Random Access Response (RAR), where the first RAR and the second RAR are the same.

In one subembodiment, the first signaling and the second signaling are respectively fields comprised in the same RAR.

In one subembodiment, the RAR is a physical layer signaling.

In one subembodiment, the RAR is a MAC layer signaling.

In one embodiment, the timing refers to timing.

In one embodiment, the timing comprises a specific slot.

In one embodiment, the timing comprises a start time of a time interval.

In one embodiment, the timing comprises an instance of time.

In one embodiment, the action of determining an uplink transmission timing for a first resource group according to at least the first TA comprises: determining an uplink transmission timing for the first resource group according to the first TA.

In one embodiment, the action of determining an uplink transmission timing for a first resource group according to at least the first TA comprises: adjusting an uplink transmission timing for the first resource group according to the first TA.

In one embodiment, the action of determining an uplink transmission timing for a first resource group according to at least the first TA comprises: calculating an uplink transmission timing for the first resource group according to the first TA.

In one embodiment, the action of determining an uplink transmission timing for a first resource group according to at least the first TA comprises: determining an uplink transmission timing for the first resource group according to the first TA and a first offset.

In one embodiment, an uplink transmission timing for the first resource group includes a timing for an uplink frame corresponding to a downlink frame.

In one embodiment, an uplink transmission timing for the first resource group includes a timing for a first uplink frame, the first uplink frame being an uplink frame corresponding to the first reference downlink frame.

In one embodiment, an uplink transmission timing for the first resource group includes a timing for a first uplink frame, the first uplink frame being an uplink frame corresponding to the first resource group.

In one embodiment, an uplink transmission timing for the first resource group includes (a) transmission time(s) of at least one PUCCH or SRS or PUSCH being associated with the first resource group.

In one embodiment, an uplink transmission timing for the first resource group includes (a) transmission time(s) of at least one uplink signal associated with the first resource group.

In one embodiment, an uplink transmission timing for the first resource group includes a time interval that a start time of a first uplink frame is advanced by compared with a start time of a first reference downlink frame, where the first uplink frame is an uplink frame corresponding to the first resource group.

In one embodiment, for the first resource group, a time in advance of a start time of a first reference downlink frame by the first $T_{TA}$ is a start time of a first uplink frame; the first uplink frame is an uplink frame corresponding to the first reference downlink frame.

In one embodiment, at least the first TA is used to determine an uplink transmission timing for a first resource group.

In one embodiment, at least the first TA is used to determine a first $T_{TA}$.

In one embodiment, the first $T_{TA}$ is equal to a time interval that a start time of a first uplink frame is advanced by compared with a start time of a first reference downlink frame.

In one embodiment, the first $T_{TA}$ is equal to a time interval that a timing for a first uplink frame is advanced by compared with a timing for a first reference downlink frame.

In one embodiment, the first $T_{TA}$ is used to determine an uplink transmission timing for a first resource group.

In one embodiment, the first $T_{TA}$ is equal to a time interval that an uplink frame is advanced by compared with a downlink frame.

In one embodiment, the first $T_{TA}$ comprises a time interval.

In one embodiment, the first $T_{TA}$ comprises a positive integer number of first time unit(s).

In one embodiment, the first $T_{TA}$ is related to the first TA.

In one embodiment, the first $T_{TA}$ is related to the first TA and a first offset.

In one embodiment, the first $T_{TA}$ comprises the first TA times first time unit.

In one embodiment, the first $T_{TA}$ comprises (the first TA+first offset)·said first time unit.

In one embodiment, the first $T_{TA}$=the first TA·the first time unit.

In one embodiment, the first $T_{TA}$=(the first TA+the first offset)·the first time unit.

In one embodiment, the first time unit is a time unit.

In one embodiment, the first time unit is a part of a subframe.

In one embodiment, the first time unit is a T.

In one embodiment, $T_c=T_{sf}/(\Delta f_{max}N_f/1000)$, where definitions of the $T_{sf}$, the $\Delta f_{max}$ and the $N_f$ can be found in TS 38.211 or TS 38.300.

In one embodiment, the first offset comprises at least one offset.

In one embodiment, the first offset comprises an offset configured by the network and an offset determined by the first node.

In one embodiment, the first offset only comprises the $N_{TA,offset}$.

In one embodiment, the first offset only comprises the $N_{TA,offset1}$.

In one embodiment, the first offset is configurable.

In one embodiment, the first offset is pre-configured.

In one embodiment, the first offset is of a fixed size.

In one embodiment, the first offset is an offset configured by RRC.

In one embodiment, the first offset is an offset estimated by the first node.

In one embodiment, the first offset is a positive number or a negative number.

In one embodiment, the first offset is equal to 0.

In one embodiment, the first offset is measured in a same unit as the first $N_{TA}$.

In one embodiment, the first offset comprises $N_{TA,offset1}$, the $N_{TA,offset1}$ being a fixed offset.

In one embodiment, the first offset comprises $N_{TA,offset}$, the $N_{TA,offset}$ being a fixed offset.

In one embodiment, the first offset comprises a timing revision about NTN.

In one embodiment, the first offset comprises $$N_{TA,adj}^{common},$$

the $$N_{TA,adj}^{common}$$

being a timing revision controlled by the network.

In one embodiment, the first offset comprises $$N_{TA,adj}^{UE},$$

the $$N_{TA,adj}^{UE}$$

being a timing revision determined by the first node.

In one embodiment, the first offset is unrelated to NTN.

In one embodiment, the first offset does not comprise $$N_{TA,adj}^{common}.$$

In one embodiment, the first offset does not comprise $$N_{TA,adj}^{UE}.$$

In one embodiment, the definition of the $N_{TA,offset}$ can be found in TS 38.211.

In one embodiment, the definition of the $$N_{TA,adj}^{common}$$

can be found in TS 38.211.

In one embodiment, the definition of the $$N_{TA,adj}^{UE}$$

can be found in TS 38.211.

In one embodiment, the first offset is configured.

In one embodiment, the first offset is not configured.

In one embodiment, if the first offset is configured, the first TA and the first offset are used to determine an uplink transmission timing for the first resource group.

In one embodiment, if the first offset is not configured, the first TA is used to determine an uplink transmission timing for the first resource group.

In one embodiment, the first TA is used to determine an uplink transmission timing for the first resource group.

In one embodiment, the first TA is used to determine a time interval that the first uplink frame is advanced by compared with the first reference downlink frame.

In one embodiment, an uplink transmission timing for the first resource group includes a timing for a first uplink frame.

In one embodiment, an uplink transmission timing for the second resource group includes a timing for a second uplink frame.

In one embodiment, the first $T_{TA}$ is a time interval that a start time of a first uplink frame is advanced by compared with a start time of a first reference downlink frame.

In one embodiment, the second $T_{TA}$ is a time interval that a start time of a second uplink frame is advanced by compared with a start time of a second reference downlink frame.

In one embodiment, a time in advance of a start time of a first reference downlink frame by the first $T_{TA}$ is a start time of a first uplink frame.

In one embodiment, a time in advance of a start time of a second reference downlink frame by the second $T_{TA}$ is a start time of a second uplink frame.

In one embodiment, the first uplink frame is associated with the first resource group, while the second uplink frame is associated with the second resource group.

In one embodiment, the first reference downlink frame is associated with the first resource group, while the second reference downlink frame is associated with the second resource group.

In one embodiment, the first reference downlink frame and the second reference downlink frame are both associated with the first resource group, or, the first reference downlink frame and the second reference downlink frame are both associated with the second resource group.

In one embodiment, the first reference downlink frame is associated with the first resource group, the second reference downlink frame being the first reference downlink frame.

In one embodiment, the first reference downlink frame and the second reference downlink frame are the same.

In one embodiment, the first reference downlink frame and the second reference downlink frame are different.

In one embodiment, the first uplink frame and the first reference downlink frame have a same frame number.

In one embodiment, the second uplink frame and the second reference downlink frame have a same frame number.

In one embodiment, the first reference downlink frame is a downlink frame i, while the first uplink frame is an uplink frame i.

In one embodiment, the second reference downlink frame is a downlink frame j, while the second uplink frame is an uplink frame j.

In one embodiment, the first reference downlink frame is a downlink frame i, while the first uplink frame is an uplink frame i; the second reference downlink frame is a downlink frame j, while the second uplink frame is an uplink frame j.

In one embodiment, the first reference downlink frame is a downlink frame i, the first uplink frame is an uplink frame i associated with the first resource group, while the second uplink frame is an uplink frame i associated with the second resource group.

In one embodiment, the action of starting or restarting a first timer comprises: starting the first timer provided that the first timer is not running.

In one embodiment, the action of starting or restarting a first timer comprises: restarting the first timer provided that the first timer is running.

In one embodiment, the meaning of starting is to begin.

In one embodiment, the meaning of starting is to make time-keeping begin.

In one embodiment, the meaning of starting is to make running begin.

In one embodiment, the first timer is a MAC layer timer.

In one embodiment, the first timer is a TAT.

In one embodiment, the first timer is a time alignment timer.

In one embodiment, a running status of the first timer is used to determine whether uplinks associated with the first TAG are aligned; the first resource group is associated with the first TAG.

In one embodiment, a running status of the first timer includes that the first timer is running.

In one embodiment, a running status of the first timer includes that the first timer is not running.

In one subembodiment, the first timer not being running includes that the first timer is expired.

In one subembodiment, the first timer not being running includes that the first timer is not started.

In one embodiment, the first timer being running is used to determine that uplinks associated with the first resource group are aligned.

In one embodiment, the first timer not being running is used to determine that uplinks associated with the first resource group are unaligned.

In one embodiment, the uplinks being aligned includes that uplink transmissions are synchronous.

In one embodiment, the uplinks being unaligned includes that uplink transmissions are nonsynchronous.

In one embodiment, the action of determining an uplink transmission timing for a second resource group according to at least the first TA and the second TA comprises: determining an uplink transmission timing for a second resource group according to the first TA and the second TA.

In one embodiment, the action of determining an uplink transmission timing for a second resource group according to at least the first TA and the second TA comprises: adjusting an uplink transmission timing for a second resource group according to the first TA and the second TA.

In one embodiment, the action of determining an uplink transmission timing for a second resource group according to at least the first TA and the second TA comprises: calculating an uplink transmission timing for a second resource group according to the first TA and the second TA.

In one embodiment, the action of determining an uplink transmission timing for a second resource group according to at least the first TA and the second TA comprises:

determining an uplink transmission timing for a second resource group according to the first TA, the second TA and a second offset.

In one embodiment, an uplink transmission timing for the second resource group includes a timing for an uplink frame corresponding to a downlink frame.

In one embodiment, an uplink transmission timing for the second resource group includes a timing for a second uplink frame, the second uplink frame being an uplink frame corresponding to the second reference downlink frame.

In one embodiment, an uplink transmission timing for the second resource group includes a timing for a second uplink frame, the second uplink frame being an uplink frame corresponding to the second resource group.

In one embodiment, an uplink transmission timing for the second resource group includes (a) transmission time(s) of at least one PUCCH or SRS or PUSCH being associated with the second resource group.

In one embodiment, an uplink transmission timing for the second resource group includes (a) transmission time(s) of at least one uplink signal associated with the second resource group.

In one embodiment, an uplink transmission timing for the second resource group includes a time interval that a start time of a second uplink frame is advanced by compared with a start time of a second reference downlink frame, the second uplink frame being an uplink frame corresponding to the second resource group.

In one embodiment, for the second resource group, a time in advance of a start time of a second reference downlink frame by the second $T_{TA}$ is a start time of a second uplink frame; the second uplink frame is an uplink frame corresponding to the second reference downlink frame.

In one embodiment, at least the second TA is used to determine an uplink transmission timing for a second resource group.

In one embodiment, at least the second TA is used to determine a second $T_{TA}$.

In one embodiment, the second $T_{TA}$ is equal to a time interval that a start time of a second uplink frame is advanced by compared with a start time of a second reference downlink frame.

In one embodiment, the second $T_{TA}$ is equal to a time interval that a timing for a second uplink frame is advanced by compared with a timing for a second reference downlink frame.

In one embodiment, the second $T_{TA}$ is equal to a time interval that an uplink frame is advanced by compared with a downlink frame.

In one embodiment, the second $T_{TA}$ comprises a time interval.

In one embodiment, the second $T_{TA}$ comprises a positive integer number of second time unit(s).

In one embodiment, the second $T_{TA}$ comprises the second TA times second time unit.

In one embodiment, the second $T_{TA}$ comprises (the second TA+second offset)·said second time unit.

In one embodiment, the second $T_{TA}$ comprises (the first TA+the second TA)·said second time unit.

In one embodiment, the second $T_{TA}$ comprises (the first TA+the second TA+second offset)·said second time unit.

In one embodiment, the second $T_{TA}$ is equal to (the second TA·the second time unit).

In one embodiment, the second $T_{TA}$ is equal to ((the first TA+the second TA)·the second time unit).

In one embodiment, the second $T_{TA}$ is equal to (first TA·the first time unit+second TA·the second time unit).

In one embodiment, the second $T_{TA}$ is equal to ((first TA+the first offset)·the first time unit+the second TA·the second time unit).

In one embodiment, the second $T_{TA}$ is equal to ((the second TA+the second offset)·the second time unit).

In one embodiment, the second $T_{TA}$ is equal to ((the first TA+the second offset)·the second time unit).

In one embodiment, the second $T_{TA}$ is equal to (the first $T_{TA}$+the second $T_A$·the second time unit).

In one embodiment, the second time unit is a time unit.

In one embodiment, the second time unit is a part of a subframe.

In one embodiment, the first time unit is a $T_c$.

In one embodiment, the first time unit and the second time unit are the same.

In one embodiment, the first time unit and the second time unit are different.

In one embodiment, the second offset comprises $N_{TA,offset1}$, the $N_{TA,offset1}$ being a fixed offset.

In one embodiment, the second offset comprises $N_{TA,offset}$, the $N_{TA,offset}$ being a fixed offset.

In one embodiment, the second offset comprises a timing revision about NTN.

In one embodiment, the second offset comprises $$N_{TA,adj}^{common},$$

the $$N_{TA,adj}^{common}$$

being a timing revision controlled by the network.

In one embodiment, the second offset comprises $$N_{TA,adj}^{UE},$$

the $$N_{TA,adj}^{UE}$$

being a timing revision determined by the first node.

In one embodiment, the second offset is unrelated to NTN.

In one embodiment, the second offset does not comprise $$N_{TA,adj}^{common}.$$

In one embodiment, the second offset does not comprise $$N_{TA,adj}^{UE}.$$

In one embodiment, the second offset comprises at least one offset.

In one embodiment, the second offset comprises an offset configured by the network and an offset determined by the first node.

In one embodiment, the second offset only comprises the $N_{TA,offset}$.

In one embodiment, the second offset is configurable.

In one embodiment, the second offset is an offset configured by RRC.

In one embodiment, the second offset is indicated by a n-TimingAdvanceOffset.

In one embodiment, the second offset is an offset estimated by the first node.

In one embodiment, the second offset is a positive number or a negative number.

In one embodiment, the second offset is equal to 0.

In one embodiment, the second offset is measured in a same unit as the second $N_{TA}$.

In one embodiment, the second offset is configured.

In one embodiment, the second offset is not configured.

In one embodiment, if the second offset is configured, the second TA and the second offset are used to determine an uplink transmission timing for the second resource group.

In one embodiment, if the second offset is not configured, the second TA is used to determine an uplink transmission timing for the second resource group.

In one embodiment, the first offset and the second offset are the same.

In one embodiment, the first offset and the second offset are different.

In one embodiment, the first cell is a serving cell of the first node.

In one embodiment, the first cell is a serving cell in the first cell group.

In one embodiment, the first cell group is a Master Cell Group (MCG) or a Secondary Cell Group (SCG), where the first cell is a SpCell in the first cell group.

In one embodiment, the first cell is a primary cell in the first cell group.

In one embodiment, the first cell is a Secondary Cell (SCell) in the first cell group.

In one embodiment, the primary cell is a Special Cell (SpCell).

In one embodiment, the primary cell is a Primary Cell (PCell).

In one embodiment, the primary cell is a Primary SCG Cell (PSCell).

In one embodiment, the first cell group is an MCG, a primary cell in the first cell group is a PCell, and a secondary cell in the first cell group is an SCell.

In one embodiment, the first cell group is an SCG, a primary cell in the first cell group is a PSCell, and a secondary cell in the first cell group is an SCell.

In one embodiment, the first cell group is an MCG, and the first cell is a PCell in the first cell group.

In one embodiment, the first cell group is an SCG, and the first cell is a PSCell in the first cell group.

In one embodiment, the first cell group is an MCG, and the first cell is an SCell in the first cell group.

In one embodiment, the first cell group is an SCG, and the first cell is an SCell in the first cell group.

In one embodiment, the first node is configured with a ServCellIndex, the ServCellIndex indicating the first cell.

In one embodiment, the first cell only comprises the first resource group and the second resource group.

In one embodiment, the first cell comprises at least the first resource group and the second resource group.

In one embodiment, each resource group of the at least one resource group is associated with a first cell.

In one embodiment, each resource group of the at least one resource group belongs to the first cell.

In one embodiment, each resource group of the at least one resource group belongs to the first cell or an additional cell of the first cell.

In one subembodiment, a physical cell identity (PCI) of the first cell is different from a PCI of the additional cell of the first cell.

In one subembodiment, the additional cell of the first cell provides extra radio resources for the first cell.

In one subembodiment, the first cell is configured with a ServCellIndex, while the additional cell of the first cell is not configured with a ServCellIndex.

In one subembodiment, the first cell and the additional cell of the first cell are configured with a same ServCellIndex.

In one subembodiment, the first cell is configured with a ServCellIndex, while the additional cell of the first cell is associated with a ServCellIndex of the first cell.

In one subembodiment, the first cell is either an SCell or a SpCell, while the additional cell of the first cell is neither an SCell nor a SpCell.

In one subembodiment, the first cell is configured with at least one SS/PBCH block (SSB) that belongs to the additional cell of the first cell.

In one subembodiment, the first cell is configured with at least one CSI reference signal (CSI-RS) that belongs to the additional cell of the first cell.

In one subembodiment, the first node is configured with one SSB in the first cell, the SSB being configured by a CSI-SSB-ResourceSet IE, the CSI-SSB-ResourceSet IE comprising a Radio Resource Control (RRC) field, the RRC field being used to indicate that the SSB belongs to the additional cell of the first cell.

In one subembodiment, the RRC field is set to a cell identifier of the additional cell of the first cell.

In one subembodiment, the RRC field is set to a physical cell identity (PCI) of the additional cell of the first cell.

In one subembodiment, the name of the RRC field includes additionalPCI.

In one subembodiment, the name of the RRC field includes additionalPCIIndex.

In one embodiment, any resource group of the at least one resource group does not belong to the additional cell of the first cell.

In one embodiment, the additional cell of the first cell is not configured.

In one embodiment, the first cell comprises at least two resource groups, where the first resource group is one of the at least two resource groups, and the second resource group is one of the at least two resource groups.

In one embodiment, the first cell only comprises the first resource group and the second resource group.

In one embodiment, the first cell comprises at least the first resource group and the second resource group.

In one embodiment, the first cell comprises the first resource group and the second resource group, and the first cell comprises at least one resource group other than the first resource group and the second resource group.

In one embodiment, the first resource group is a resource group.

In one embodiment, the second resource group is a resource group.

In one embodiment, each radio resource in a resource group is an uplink resource.

In one embodiment, each radio resource in a resource group is a downlink resource.

In one embodiment, each radio resource in a resource group is a beam.

In one embodiment, each radio resource in a resource group is an antenna port.

In one embodiment, each radio resource in a resource group is a reference signal resource.

In one embodiment, each radio resource in a resource group is an uplink reference signal resource.

In one embodiment, each radio resource in a resource group is a downlink reference signal resource.

In one embodiment, each radio resource in a resource group is an SSB resource.

In one embodiment, each radio resource in a resource group is a CSI-RS resource.

In one embodiment, each radio resource in a resource group is an SSB resource or a CSI-RS resource.

In one embodiment, each radio resource in a resource group is a reference signal of a PUCCH or an SRS or a PUSCH, where the reference signal is an SSB or a CSI-RS.

In one embodiment, a radio resource is used for transmitting a PUCCH or an SRS or a PUSCH.

In one embodiment, a radio resource is used for uplink transmission.

In one embodiment, a radio resource is used for a Physical random-access channel (PRACH) transmission.

In one embodiment, a radio resource is used for a PRACH transmission for Contention Free Random Access (CFRA).

In one embodiment, a radio resource is used for a PRACH transmission for Contention Based Random Access (CBRA).

In one embodiment, a radio resource comprises a frequency-domain resource.

In one embodiment, a radio resource comprises a time-domain resource.

In one embodiment, a radio resource comprises a code-domain resource.

In one embodiment, a radio resource comprises a spatial-domain resource.

In one embodiment, a radio resource comprises a power resource.

In one embodiment, a radio resource comprises at least one of a frequency-domain resource or a code-domain resource or a code-domain resource or a spatial-domain resource.

In one embodiment, a spatial-domain resource comprises an antenna port.

In one embodiment, a spatial-domain resource comprises a port.

In one embodiment, a spatial-domain resource comprises a panel.

In one embodiment, a radio resource comprises a spatial setting.

In one embodiment, a radio resource comprises Spatial Relation Information.

In one embodiment, a radio resource is associated with an SSB or a CSI-RS.

In one embodiment, the phrase that any radio resource in the first resource group is different from any radio resource in the second resource group comprises that: any radio resource in the first resource group is associated with a first TRP, while any radio resource in the second resource group is associated with a second TRP, the first TRP and the second TRP belonging to the first cell.

In one embodiment, the phrase that any radio resource in the first resource group is different from any radio resource in the second resource group comprises that: an index of any radio resource in the first resource group is different from an index of any radio resource in the second resource group.

In one embodiment, the phrase that any radio resource in the first resource group is different from any radio resource in the second resource group comprises that: Any radio resource in the first resource group does not belong to the second resource group, and any radio resource in the second resource group does not belong to the first resource group.

In one embodiment, the phrase that any radio resource in the first resource group is different from any radio resource in the second resource group comprises that: any radio resource in the first resource group and any radio resource in the second resource group are associated with different reference signal resources.

In one embodiment, the phrase that any radio resource in the first resource group is different from any radio resource in the second resource group comprises that: any radio resource in the first resource group and any radio resource in the second resource group are associated with different TRPs.

In one embodiment, the phrase that any radio resource in the first resource group is different from any radio resource in the second resource group comprises that: any radio resource in the first resource group and any radio resource in the second resource group are associated with different SSBs or CSI-RSs.

In one embodiment, the phrase that any radio resource in the first resource group is different from any radio resource in the second resource group comprises that: any radio resource in the first resource group and any radio resource in the second resource group are associated with different Transmission Configuration Indicator (TCIs).

In one embodiment, the phrase that any radio resource in the first resource group is different from any radio resource in the second resource group comprises that: a reference signal resource associated with any radio resource in the first resource group and a reference signal resource associated with any radio resource in the second resource group have different Quasi co-location (QCL) relations.

In one embodiment, the phrase that any radio resource in the first resource group is different from any radio resource in the second resource group comprises that: any radio resource in the first resource group and any radio resource in the second resource group are associated with different time-domain resources.

In one embodiment, the phrase that any radio resource in the first resource group is different from any radio resource in the second resource group comprises that: any radio resource in the first resource group and any radio resource in the second resource group are associated with different frequency-domain resources.

In one embodiment, the phrase that any radio resource in the first resource group is different from any radio resource in the second resource group comprises that: any radio resource in the first resource group and any radio resource in the second resource group are associated with different spatial-domain resources.

In one embodiment, the phrase that any radio resource in the first resource group is different from any radio resource in the second resource group comprises that: any radio resource in the first resource group and any radio resource in the second resource group are associated with different code-domain resources.

In one embodiment, as a response to the first signaling being received, determining uplink transmission timings for a first resource group and a second resource group according to the first $T_A$, and starting or restarting a first timer.

In one embodiment, a running status of the first timer is used to determine whether uplinks associated with the first resource group and the second resource group are aligned.

In one embodiment, a running status of the first timer is used to determine whether uplinks associated with the first TAG are aligned; the first resource group is associated with the first TAG.

In one embodiment, a running status of the first timer is not used to determine whether uplinks associated with the second resource group are aligned.

In one embodiment, whether uplinks associated with the second resource group are aligned is unrelated to the running status of the first timer.

In one embodiment, the second TA being received is not used for starting or restarting a first timer.

In one embodiment, transmitters for the first signaling and the second signaling are a same TRP.

In one embodiment, transmitters for the first signaling and the second signaling are not a same TRP.

In one embodiment, transmitters for the first signaling and the second signaling are both a maintenance base station for the first cell.

In one embodiment, transmitters for the first signaling and the second signaling are both a maintenance base station for an additional cell of the first cell.

In one embodiment, a transmitter for the first signaling and a transmitter for the second signaling are respectively a maintenance base station for the first cell and a maintenance base station for an additional cell of the first cell.

In one embodiment, a transmitter for the first signaling and a transmitter for the second signaling are respectively a maintenance base station for an additional cell of the first cell and a maintenance base station for the first cell.

Embodiment 2

Embodiment 2 illustrates a schematic diagram of a network architecture according to one embodiment of the present application, as shown in FIG. 2. FIG. 2 is a diagram illustrating a network architecture 200 of 5G New Radio (NR)/Long-Term Evolution (LTE)/Long-Term Evolution Advanced (LTE-A) system. The 5G NR/LTE/LTE-A network architecture 200 may be called 5G System/Evolved Packet System (5GS/EPS) 200 or other appropriate terms. The 5GS/EPS 200 may comprise one or more UEs 201, a RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The RAN comprises a node 203 and another node 204. The node 203 provides UE 201 oriented user plane and control plane terminations. The node 203 can be connected to another node 204 via an Xn interface (like backhaul)/X2 interface. The node 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The node 203 provides an access point to the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The node 203 is connected to 5GC/EPC 210 via a S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing signaling between the UE 201 and the 5GC/EPC 210. Generally, the MME/AMF/SMF 211 provides bearer and connection management. All user Internet Protocol (IP) packets are transmitted through the S-GW/UPF 212. The 5-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 is a UE.

In one embodiment, the node 203 corresponds to the second node in the present application.

In one embodiment, the node 203 is a BaseStation (BS).

In one embodiment, the node 203 is a Base Transceiver Station (BTS).

In one embodiment, the node 203 is a NodeB (NB).

In one embodiment, the node 203 is a gNB.

In one embodiment, the node 203 is an eNB.

In one embodiment, the node 203 is a ng-eNB.

In one embodiment, the node 203 is an en-gNB.

In one embodiment, the node 203 is a UE.

In one embodiment, the node 203 is a relay.

In one embodiment, the node 203 is a Gateway.

In one embodiment, the node 203 comprises a TRP.

In one embodiment, the node 203 comprises at least two TRPs.

In one embodiment, the node 203 comprises the first sub-node and the second sub-node in the present application.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE comprises an aircraft.

In one embodiment, the UE comprises a vehicle-mounted terminal.

In one embodiment, the UE comprises a vessel.

In one embodiment, the UE comprises an Internet-of-Things (IoT) terminal.

In one embodiment, the UE comprises an Industrial IoT (IIoT) terminal.

In one embodiment, the UE is a piece of equipment supporting transmissions with low delay and high reliability.

In one embodiment, the UE comprises test equipment.

In one embodiment, the UE comprises a signaling test instrument.

In one embodiment, the base station supports transmissions in NTN.

In one embodiment, the base station supports transmissions in large-delay-difference networks.

In one embodiment, the base station supports transmissions in TN.

In one embodiment, the base station comprises a Macro-Cellular base station.

In one embodiment, the base station comprises a Micro Cell base station.

In one embodiment, the base station comprises a Pico Cell base station.

In one embodiment, the base station comprises a Femto-cell.

In one embodiment, the base station comprises a base station device supporting large time-delay difference.

In one embodiment, the base station comprises a flight platform.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling test instrument.

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises a L3 relay.

In one embodiment, the relay comprises a L2 relay.

In one embodiment, the relay comprises a Router.

In one embodiment, the relay comprises an Exchanger.

In one embodiment, the relay comprises a UE.

In one embodiment, the relay comprises a base station.

Embodiment 3

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, which comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell, as well as for HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the first signaling in the present application is generated by the MAC 302 or the MAC 352.

In one embodiment, the first signaling in the present application is generated by the PHY 301 or the PHY 351.

In one embodiment, the second signaling in the present application is generated by the RRC 306.

In one embodiment, the second signaling in the present application is generated by the MAC 302 or the MAC 352.

In one embodiment, the second signaling in the present application is generated by the PHY 301 or the PHY 351.

In one embodiment, the third signaling in the present application is generated by the RRC 306.

In one embodiment, the third signaling in the present application is generated by the MAC 302 or the MAC 352.

In one embodiment, the third signaling in the present application is generated by the PHY 301 or the PHY 351.

In one embodiment, the first radio signal in the present application is generated by the PHY 301 or the PHY 351.

In one embodiment, the second radio signal in the present application is generated by the PHY 301 or the PHY 351.

Embodiment 4

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor. the first communication device 450 at least: receives a first signaling, the first signaling being used to determine a first Timing Advance (TA); and receives a second signaling, the second signaling being used to determine a second TA; and as a response to the first signaling being received, determines an uplink transmission timing for a first resource group according to at least the first TA, and starts or restarts a first timer, where a running status of the first timer is used to determine whether uplinks associated with the first resource group are aligned; and as a response to the second signaling being received, determines an uplink transmission timing for a second resource group according to at least the first TA and the second TA; herein, the first resource group and the second resource group are both associated with a first cell; the first resource group comprises at least one radio resource; the second resource group comprises at least one radio resource; any radio resource in the first resource group is different from any radio resource in the second resource group.

In one embodiment, the first communication node 450 comprises a memory that stores a computer readable instruction program, the computer readable instruction program generates actions when executed by at least one processor, which include: receiving a first signaling, the first signaling being used to determine a first Timing Advance (TA); and receiving a second signaling, the second signaling being used to determine a second TA; and as a response to the first signaling being received, determining an uplink transmission timing for a first resource group according to at least the first TA, and starting or restarting a first timer, where a running status of the first timer is used to determine whether uplinks associated with the first resource group are aligned; and as a response to the second signaling being received, determining an uplink transmission timing for a second resource group according to at least the first TA and the second TA; herein, the first resource group and the second resource group are both associated with a first cell; the first resource group comprises at least one radio resource; the second resource group comprises at least one radio resource; any radio resource in the first resource group is different from any radio resource in the second resource group.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used to determine a first TA, and at least the first TA being used to determine an uplink transmission timing for a first resource group; and transmits a second signaling, the second signaling being used to determine a second TA, and at least the first TA and the second TA being used to determine an uplink transmission timing for a second resource group; herein, as a response to the first signaling being received, a first timer is started or restarted, and a running status of the first timer is used to determine whether uplinks associated with the first resource group are aligned; the first resource group and the second resource group are both associated with a first cell; the first resource group comprises at least one radio resource; the second resource group comprises at least one radio resource; any radio resource in the first resource group is different from any radio resource in the second resource group.

In one embodiment, the second communication node 410 comprises a memory that stores a computer readable instruction program, the computer readable instruction program generates actions when executed by at least one processor, which include: transmitting a first signaling, the first signaling being used to determine a first TA, and at least the first TA being used to determine an uplink transmission timing for a first resource group; and transmitting a second signaling, the second signaling being used to determine a second TA, and at least the first TA and the second TA being used to determine an uplink transmission timing for a second resource group; herein, as a response to the first signaling being received, a first timer is started or restarted, and a running status of the first timer is used to determine whether uplinks associated with the first resource group are aligned; the first resource group and the second resource group are both associated with a first cell; the first resource group comprises at least one radio resource; the second resource group comprises at least one radio resource; any radio resource in the first resource group is different from any radio resource in the second resource group.

In one embodiment, the antenna 452, the receiver 454, the receiving processor 456, and the controller/processor 459 are used for receiving a first signaling; at least one of the antenna 420, the transmitter 418, the transmitting processor 416 or the controller/processor 475 is used for transmitting a first signaling.

In one embodiment, the antenna 452, the receiver 454, the receiving processor 456, and the controller/processor 459 are used for receiving a second signaling; at least one of the antenna 420, the transmitter 418, the transmitting processor 416 or the controller/processor 475 is used for transmitting a second signaling.

In one embodiment, the antenna 452, the receiver 454, the receiving processor 456, and the controller/processor 459 are used for receiving a third signaling; at least one of the antenna 420, the transmitter 418, the transmitting processor 416 or the controller/processor 475 is used for transmitting a third signaling.

In one embodiment, the antenna 452, the transmitter 454, the transmitting processor 468 and the controller/processor 459 are used for transmitting a first signal; at least one of the antenna 420, the receiver 418, the receiving processor 470 or the controller/processor 475 is used for receiving a first signal.

In one embodiment, the antenna 452, the transmitter 454, the transmitting processor 468 and the controller/processor 459 are used for transmitting a second signal; at least one of the antenna 420, the receiver 418, the receiving processor 470 or the controller/processor 475 is used for receiving a second signal.

In one embodiment, the antenna 452, the transmitter 454, the transmitting processor 468 and the controller/processor 459 are used for transmitting a first radio signal; at least one of the antenna 420, the receiver 418, the receiving processor 470 or the controller/processor 475 is used for receiving a first radio signal.

In one embodiment, the antenna 452, the transmitter 454, the transmitting processor 468 and the controller/processor 459 are used for transmitting a second radio signal; at least one of the antenna 420, the receiver 418, the receiving processor 470 or the controller/processor 475 is used for receiving a second radio signal.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5

Embodiment 5 illustrates a flowchart of radio signal transmission according to one embodiment of the present application, as shown in FIG. 5. It should be particularly noted that the sequence illustrated herein does not set any limit to the signal transmission order or implementation order in the present application.

The first node U01 receives a first signaling in step S5101, the first signaling being used to determine a first Timing Advance (TA); and in step S5102, as a response to the first signaling being received, determines an uplink transmission timing for a first resource group according to at least the first TA; and in step S5103, as a response to the first signaling being received, starts or restarts a first timer, and a running status of the first timer is used to determine whether uplinks associated with the first resource group are aligned; receives a second signaling in step S5104, the second signaling being used to determine a second TA; and in step S5105, as a response to the second signaling being received, determines an uplink transmission timing for a second resource group according to at least the second TA; and in step S5106, as a response to the second signaling being received, starts or restarts the first timer.

The second node N02 transmits the first signaling in step S5201; and transmits the second signaling in step S5202.

In Embodiment 5, the first resource group and the second resource group are both associated with a first cell; the first resource group comprises at least one radio resource; the second resource group comprises at least one radio resource; any radio resource in the first resource group is different from any radio resource in the second resource group.

In one embodiment, in step S5105, as a response to the second signaling being received, determining an uplink transmission timing for a second resource group according to at least the first TA and the second TA.

In one embodiment, in step S5105, as a response to the second signaling being received, determining an uplink transmission timing for a second resource group according to at least the second TA; an uplink transmission timing for the second resource group is unrelated to the first TA.

In one embodiment, the second signaling comprises at least one Octet, where each Octet comprises 8 bits; the second signaling is a MAC CE.

In one embodiment, the second signaling comprises at least one Octet, where each Octet comprises 8 bits; the second signaling is a Random Access Response (RAR).

In one embodiment, a MAC subheader corresponding to the second signaling is used to determine that the second TA is for the first cell.

In one embodiment, a LCID of the second signaling is used to determine that the second TA is for the first cell.

In one embodiment, the second signaling comprises a first field, the first field being used to indicate the first cell.

In one embodiment, the second signaling comprises a first bitmap, the first field being a bit in the first bitmap.

In one embodiment, the first bitmap comprises a bit string.

In one embodiment, the first bitmap is a bitmap.

In one embodiment, each bit in the first bitmap indicates a cell in the first cell group, where a bit in the first bitmap indicates the first cell; the first bitmap comprises Q1 bits, Q1 being a positive integer.

In one subembodiment, Q1 is equal to 8.

In one subembodiment, Q1 is equal to 7.

In one subembodiment, Q1 is equal to 32.

In one subembodiment, Q1 is equal to 31.

In one subembodiment, if a bit in the first bitmap is set to 1, the second signaling comprises an uplink transmission timing for a resource group corresponding to the bit; if each bit in the first bitmap is set to 0, the second signaling does not comprise an uplink transmission timing for a resource group corresponding to the bit.

In one subembodiment, a bit in the first bitmap that indicates the first cell is set to 1.

In one embodiment, the first field is used to determine that the second TA is for the first cell.

In one embodiment, the first field comprises a positive integer number of bit(s).

In one embodiment, the first field is 1 bit comprised in the second signaling.

In one embodiment, the first field is a Serving Cell ID field, the Serving Cell ID field indicating an identifier of a serving cell of the first cell, the first field comprising 5 bits.

In one embodiment, the first field indicates a serving cell identifier of the first cell.

In one embodiment, the first field indicates an index of the first cell in the first cell group.

In one embodiment, the second signaling comprises the first bitmap, and the second signaling comprises a TA for a cell indicated by each bit in the first bitmap which is set to 1; the first field is a field in the first bitmap.

In one embodiment, the second signaling comprises P1 given field(s), if a given field exists, the given field is used to indicate an uplink transmission timing for a resource group corresponding to the given field.

In one embodiment, the second signaling comprises P1 second-type TA(s), where the second TA is one of the P1 second-type TA(s); P1 is a positive integer.

In one embodiment, each of the P1 second-type TA(s) is used to determine an uplink transmission timing for a resource group in a cell comprised in the first cell group.

In one embodiment, the P1 is of a fixed size.

In one subembodiment, P1 is equal to 1.

In one subembodiment, P1 is equal to 2.

In one subembodiment, P1 is equal to 8.

In one subembodiment, P1 is equal to Q1.

In one embodiment, P1 is variable.

In one subembodiment, P1 is no greater than Q1.

In one subembodiment, P1 is equal to the number of bit(s) set to 1 comprised in the first bitmap.

In one embodiment, the second signaling does not comprise the first field.

In one embodiment, the second signaling does not comprise the first bitmap.

In one embodiment, an RRC message is used to determine that the second TA is for the second resource group.

In one embodiment, a MAC subheader corresponding to the second signaling is used to determine that the second TA is for the second resource group.

In one embodiment, a LCID of the second signaling is used to determine that the second TA is for the second resource group.

In one embodiment, the second signaling comprises a second field, the second field being used to indicate the second resource group.

In one embodiment, the second field is used to determine that the second TA is for the second resource group.

In one embodiment, the second field indicates the second resource group.

In one embodiment, the second field indicates a reference signal set, where the second resource group is associated with the reference signal set.

In one embodiment, the second field indicates a TCI, where the second resource group is associated with the TCI.

In one embodiment, the second field indicates a CORESET, where the second resource group is associated with the CORESET.

In one embodiment, the second field comprises an index of the second resource group in the first cell.

In one embodiment, the second field comprises an index of a TCI associated with the second resource group.

In one embodiment, the second field comprises an index of a CORESET associated with the second resource group.

In one embodiment, the second field comprises an index of a reference signal set associated with the second resource group, where the reference signal set associated with the second resource group comprises at least one reference signal resource.

In one subembodiment, each reference signal resource in the at least one reference signal resource is an SSB.

In one subembodiment, each reference signal resource in the at least one reference signal resource is a CSI-RS.

In one subembodiment, each reference signal resource in the at least one reference signal resource is an SSB or a CSI-RS.

In one embodiment, the second signaling does not comprise a second field.

In one embodiment, the second signaling comprises a first control field, the first control field being used to indicate that the second signaling comprises the given field.

In one subembodiment, the first control field comprises 1 bit.

In one subembodiment, the first control field being set to 1 is used to indicate that the given field exists, while the first control field being set to 0 is used to indicate that the given field is reserved.

In one subembodiment, if the given field is reserved, the given field is set to all-0.

In one subembodiment, if the given field is reserved, the given field is set to all-1.

In one subembodiment, if the given field is reserved, the given field is set to any value.

In one embodiment, the second signaling does not comprise the first control field.

In one embodiment, the reserved field is an R field.

In one embodiment, the reserved field is set to any value.

In one embodiment, the reserved field is set to a preset value.

In one embodiment, the reserved field is set to all-0.

In one embodiment, the reserved field is set to all-1.

In one embodiment, a bit size (number of bits) in the reserved field is no less than 1 and less than 8.

In one embodiment, the second signaling comprises a third field, the third field being used to determine whether the second TA is a positive number or a negative number.

In one embodiment, the second signaling comprises a third field, the third field being used to determine whether the second TA is a positive number or a negative number; the second TA is equal to (the second $T_A$·second value).

In one embodiment, the third field is a MAC field.

In one embodiment, the third field comprises one bit.

In one embodiment, the size of the third field is equal to 1 bit.

In one embodiment, the third field being set to 1 indicates that the second TA is a positive number, while the third field being set to 0 indicates that the second TA is a negative value.

In one embodiment, the third field being set to 0 indicates that the second TA is a positive number, while the third field being set to 1 indicates that the second TA is a negative value.

In one embodiment, the third field being set to 0 indicates that an uplink transmission timing for the first resource group is earlier than an uplink transmission timing for the second resource group; the third field being set to 1 indicates that an uplink transmission timing for the first resource group is later than an uplink transmission timing for the second resource group.

In one embodiment, the third field being set to 1 indicates that an uplink transmission timing for the first resource group is earlier than an uplink transmission timing for the second resource group; the third field being set to 0 indicates that an uplink transmission timing for the first resource group is later than an uplink transmission timing for the second resource group.

In one embodiment, the third field being set to 0 indicates that a sum of the first TA and the second TA is used to determine an uplink transmission timing for the second resource group; the third field being set to 1 indicates that a difference between the first TA and the second TA is used to determine an uplink transmission timing for the second resource group.

In one embodiment, the third field being set to 1 indicates that a sum of the first TA and the second TA is used to determine an uplink transmission timing for the second resource group; the third field being set to 0 indicates that a difference between the first TA and the second TA is used to determine an uplink transmission timing for the second resource group.

In one embodiment, the second signaling comprises the given field, or the first field, or the second field, or the third field, or at least a former one of the first control field or a reserved field.

In one embodiment, the second signaling consists of the given field, or the first field, or the second field, or the third field, or at least a former one of the first control field or a reserved field.

In one embodiment, the given field, or the first field, or the second field, or the third field, or at least a former one of the first control field or a reserved field belongs to the second signaling; the second signaling is a MAC CE.

In one embodiment, the given field, or the first field, or the second field, or the third field, or at least a former one of the first control field or a reserved field belongs to the second signaling; the second signaling is a Random Access Response (RAR).

In one embodiment, the second signaling does not comprise any of the first field, or the second field, or the third field, or the first control field or a reserved field.

In one embodiment, the second signaling does not comprise a third field.

In one embodiment, the step S5101 is taken before the step S5104.

In one embodiment, the step S5101 is taken after the step S5104.

In one embodiment, the step S5106 is optional.

In one embodiment, the step S5106 exists.

In one subembodiment, as a response to the second signaling being received, starting or restarting the first timer.

In one subembodiment, the second TA being received is used for starting or restarting the first timer.

In one embodiment, the step S5106 does not exist.

In one subembodiment, the second TA being received is not used for starting or restarting the first timer.

In one embodiment, the step S5104 belongs to the step S5101.

In one embodiment, the step S5104 is taken after the step S5101.

In one embodiment, the step S5104 is taken before the step S5101.

In one embodiment, as a response to the first timer being expired, executing a first action set; the first action set comprises at least one of flushing all HARQ buffers associated with the first cell, or, notifying a higher layer of releasing all first-type resources associated with the first cell, or, deleting all second-type resources associated with the first cell; the first-type resource comprises at least one of a PUCCH or an SRS; the second-type resource comprises at least one of a configured downlink assignment or a configured uplink grant or a PUSCH resource for semi-persistent CSI reporting.

In one embodiment, as a response to the first timer being expired, executing a first action set; the first action set comprises at least one of flushing all HARQ buffers associated with the first resource group, or, notifying a higher layer of releasing all first-type resources associated with the first resource group, or, deleting all second-type resources associated with the first resource group; the first-type resource comprises at least one of a PUCCH or an SRS; the second-type resource comprises at least one of a configured downlink assignment or a configured uplink grant or a PUSCH resource for semi-persistent CSI reporting.

In one subembodiment, as a response to the first timer being expired, HARQ buffers associated with the second resource group are not emptied.

In one subembodiment, all first-type resources being associated with the second resource group are not released.

In one subembodiment, all second-type resources being associated with the second resource group are not deleted.

Embodiment 6

Embodiment 6 illustrates a flowchart of signal transmission according to another embodiment of the present application, as shown in FIG. 6.

The first node U01 determines that a first timer is expired in step S6101; and executes a first action set as a response to the first timer being expired in step S6102.

In Embodiment 6, the first action set comprises at least one of flushing all HARQ buffers associated with the first cell, or, notifying a higher layer of releasing all first-type resources associated with the first cell, or, deleting all second-type resources associated with the first cell; the first-type resource comprises at least one of a PUCCH or an SRS; the second-type resource comprises at least one of a configured downlink assignment or a configured uplink grant or a PUSCH resource for semi-persistent CSI reporting.

In one embodiment, when the first timer is expired, it is assumed that uplinks associated with the first resource group are not aligned, and it is assumed that uplinks associated with the second resource group are not aligned.

In one embodiment, the first timer being expired means that the first timer reaches an expiration value of the first timer.

In one embodiment, the first timer being expired means that timing of the first timer is equal to an expiration value of the first timer, once started or restarted the first timer starts counting time from 0 in an increasing manner.

In one embodiment, the first timer being expired means that timing of the first timer is equal to 0, once started or restarted the first timer starts counting time from an expiration value of the first timer in a decreasing manner.

In one embodiment, the first timer being expired means that the time while the first timer is started or restarted reaches an expiration value of the first timer.

In one embodiment, an expiration value of the first timer is configured via a dedicated signaling.

In one embodiment, an expiration value of the first timer is configured via a broadcast signaling.

In one embodiment, an expiration value of the first timer is configured through an RRC message.

In one embodiment, an expiration value of the first timer is configurable.

In one embodiment, an expiration value of the first timer is pre-configured.

In one embodiment, the first timer reaching an expiration value of the first timer is used to determine that the first timer is expired.

In one embodiment, a HARQ buffer corresponds to a HARQ process, the HARQ process being associated with a resource group in the first cell.

In one embodiment, a piece of Downlink Control Information (DCI) is used to determine a resource group with which the HARQ process is associated.

In one subembodiment, the DCI explicitly indicates a resource group with which the HARQ process is associated.

In one subembodiment, the DCI explicitly indicates whether the HARQ process is associated with the first resource group or the second resource group; the at least one resource group refer to 2 resource groups.

In one subembodiment, a field in the DCI comprises an index, the index indicating a resource group; if the index indicates the resource group, the HARQ process is associated with the resource group.

In one subembodiment, a field in the DCI comprises an index, the index indicating the first resource group or the second resource group; if the index indicates the first resource group, the HARQ process is associated with the first resource group, if the index indicates the second resource group, the HARQ process is associated with the second resource group; the at least one resource group refer to 2 resource groups.

In one subsidiary embodiment of the above subembodiment, the other field in the DCI comprises a HARQ process ID, where a HARQ process ID is used for indicating the HARQ process; the DCI is scrambled by a Cell RNTI (C-RNTI), or, the DCI is scrambled by a Modulation and Coding Scheme RNTI (MCS-RNTI) or a Configured Scheduling RNTI (CS-RNTI).

In one subsidiary embodiment of the above subembodiment, the DCI is scrambled by a Temporary RNTI (TC-RNTI).

In one subsidiary embodiment of the above subembodiment, a format of the DCI includes DCI format 0_0.

In one subembodiment, the DCI implicitly indicates a resource group with which the HARQ process is associated.

In one subembodiment, the DCI implicitly indicates whether the HARQ process is associated with the first resource group or the second resource group; the at least one resource group refer to 2 resource groups.

In one subembodiment, Demodulation Reference Signal (DM-RS) antenna port properties of a PDCCH used for receiving the DCI are used to determine a resource group with which the HARQ process is associated.

In one subembodiment, DM-RS antenna port properties of a PDCCH used for receiving the DCI are used to determine whether the HARQ process is associated with the first resource group or the second resource group; the at least one resource group refer to 2 resource groups.

In one subembodiment, spatial parameters of a PDCCH used for receiving the DCI are used to determine a resource group with which the HARQ process is associated.

In one subembodiment, spatial parameters of a PDCCH used for receiving the DCI are used to determine whether the HARQ process is associated with the first resource group or the second resource group; the at least one resource group refer to 2 resource groups.

In one embodiment, a HARQ process ID is used to indicate the HARQ process, and the HARQ process ID is used to determine a resource group with which the HARQ process is associated.

In one embodiment, a HARQ process ID is used to indicate the HARQ process, and the HARQ process ID is used to determine whether the HARQ process is associated with the first resource group or the second resource group; the at least one resource group refer to 2 resource groups.

In one subembodiment, the HARQ process ID is no less than 0, and the HARQ process ID is no greater than N1, N1 being a positive integer.

In one subembodiment, the HARQ process ID is no less than 1, and the HARQ process ID is no greater than N1, N1 being a positive integer.

In one subembodiment, N1 is equal to 15.

In one subembodiment, N1 is equal to 31.

In one subembodiment, if the HARQ process ID is no greater than N2, the HARQ process is associated with the first resource group; if the HARQ process ID is greater than N2, the HARQ process is associated with the second resource group; N2 is a positive integer, and N2 is less than N1.

In one subembodiment, if the HARQ process ID is no less than N2, the HARQ process is associated with the first resource group; if the HARQ process ID is less than N2, the HARQ process is associated with the second resource group; N2 is a positive integer, and N2 is less than N1.

In one embodiment, all HARQ buffers associated with the first cell refer to: all HARQ buffers associated with the first resource group and all HARQ buffers associated with the second resource group.

In one embodiment, the higher layer is an RRC layer.

In one embodiment, the higher layer is a protocol layer above a MAC layer.

In one embodiment, whether a first-type resource is associated with the first resource group or the second resource group is explicitly indicated; the number of resource groups in the first cell is greater than 1.

In one embodiment, whether a first-type resource is associated with the first resource group or the second resource group is implicitly indicated; the number of resource groups in the first cell is greater than 1.

In one embodiment, the first-type resource is configured via an RRC message.

In one embodiment, the first-type resource comprises a PUCCH resource or an SRS resource.

In one embodiment, the first-type resource comprises a PUCCH resource.

In one embodiment, the first-type resource comprises an SRS resource.

In one embodiment, the SRS resource is configured through SRS-Config.

In one embodiment, the PUCCH resource is configured through PUCCH-Config.

In one embodiment, any first-type resource associated with the first cell belongs to a resource group among the at least one resource group.

In one embodiment, any first-type resource associated with the first cell belongs to the first resource group or the second resource group.

In one embodiment, all first-type resources associated with the first cell refer to: first-type resources that belong to the first cell.

In one embodiment, all first-type resources associated with the first cell refer to: first-type resources configured for the first cell.

In one embodiment, all first-type resources associated with the first cell refer to: first-type resources configured for any TRP in the first cell.

In one embodiment, all first-type resources associated with the first cell refer to: all first-type resources associated with the first resource group and all first-type resources associated with the second resource group.

In one embodiment, a first-type resource associated with the first resource group refers to: a first-type resource belonging to the first resource group.

In one embodiment, a first-type resource associated with the first resource group refers to: a first-type resource configured for the first resource group.

In one embodiment, a first-type resource associated with the first resource group refers to: a first-type resource configured for a TRP corresponding to the first resource group.

In one embodiment, a first-type resource associated with the first resource group refers to: a first-type resource configured with an index of the first resource group.

In one embodiment, if a first-type resource is associated with the first resource group, a radio signal that the first-type resource bears is transmitted by a maintenance node maintaining the first resource group.

In one embodiment, a first-type resource associated with the second resource group refers to: a first-type resource belonging to the second resource group.

In one embodiment, a first-type resource associated with the second resource group refers to: a first-type resource configured for the second resource group.

In one embodiment, a first-type resource associated with the second resource group refers to: a first-type resource configured for a TRP corresponding to the second resource group.

In one embodiment, a first-type resource associated with the second resource group refers to: a first-type resource configured with an index of the second resource group.

In one embodiment, if a first-type resource is associated with the second resource group, a radio signal that the first-type resource bears is transmitted by a maintenance node maintaining the second resource group.

In one embodiment, the deleting means to delete in a MAC layer.

In one embodiment, the deleting means to clear.

In one embodiment, whether a second-type resource is associated with the first resource group or the second resource group is explicitly indicated; the number of resource groups in the first cell is greater than 1.

In one embodiment, whether a second-type resource is associated with the first resource group or the second resource group is implicitly indicated; the number of resource groups in the first cell is greater than 1.

In one embodiment, the second-type resource is configured via an RRC message.

In one embodiment, the second-type resource comprises configured downlink assignments.

In one embodiment, the second-type resource comprises configured uplink grants.

In one embodiment, the second-type resource comprises a PUSCH resource for semi-persistent CSI reporting.

In one embodiment, any second-type resource associated with the first cell belongs to the first resource group or the second resource group.

In one embodiment, each second-type resource of all second-type resources associated with the first cell belongs to any of the first resource group or the second resource group.

In one embodiment, all second-type resources associated with the first cell comprise all second-type resources associated with the first resource group and all second-type resources associated with the second resource group.

In one embodiment, a second-type resource associated with the first resource group refers to: a second-type resource configured for the first resource group.

In one embodiment, a second-type resource associated with the first resource group refers to: a second-type resource configured for a TRP corresponding to the first resource group.

In one embodiment, a second-type resource associated with the first resource group refers to: a second-type resource configured with an index of the first resource group.

In one embodiment, if a second-type resource is associated with the first resource group, a radio signal that the second-type resource bears is transmitted by a maintenance node maintaining the first resource group.

In one embodiment, a second-type resource associated with the second resource group refers to: a second-type resource configured for the second resource group.

In one embodiment, a second-type resource associated with the second resource group refers to: a second-type resource configured for a TRP corresponding to the second resource group.

In one embodiment, a second-type resource associated with the second resource group refers to: a second-type resource configured with an index of the second resource group.

In one embodiment, if a second-type resource is associated with the second resource group, a radio signal that the second-type resource bears is transmitted by a maintenance node maintaining the second resource group.

In one embodiment, the configured downlink assignment is configured via an RRC message.

In one embodiment, the configured downlink assignment comprises a resource configured by SPS-Config.

In one embodiment, the configured downlink assignment comprises a resource indicated by an SPS-ConfigIndex.

In one embodiment, the configured uplink grant is configured via an RRC message.

In one embodiment, the configured uplink grant is a UL grant.

In one embodiment, the configured uplink grant is a PUSCH resource.

In one embodiment, the configured uplink grant comprises a resource configured by ConfiguredGrantConfig.

In one embodiment, the configured uplink grant comprises a resource indicated by a ConfiguredGrantConfigIndex.

In one embodiment, the PUSCH resource for semi-persistent CSI reporting is configured via an RRC message.

In one embodiment, the PUSCH resource for semi-persistent CSI reporting comprises a resource configured by CSI-ReportConfig.

In one embodiment, the PUSCH resource for semi-persistent CSI reporting comprises a resource indicated by CSI-ReportConfigId.

In one embodiment, the PUSCH resource for semi-persistent CSI reporting comprises a resource configured by CSI-ResourceConfig.

In one embodiment, the PUSCH resource for semi-persistent CSI reporting comprises a resource indicated by CSI-ResourceConfigId.

Embodiment 7

Embodiment 7 illustrates a flowchart of signal transmission according to a third embodiment of the present application, as shown in FIG. 7. It should be particularly noted that the sequence illustrated herein does not set any limit to the signal transmission order or implementation order in the present application.

The first node U01 receives a third signaling, the third signaling being used to determine a target TAG set, the target TAG set comprising at least one TAG, where a first TAG is one TAG comprised in the target TAG set.

The second node N02 transmits the third signaling.

In Embodiment 7, the first TAG comprises the first resource group.

In one embodiment, the first TAG comprises the second resource group.

In one subembodiment, the first TAG comprises the first resource group and the second resource group.

In one subembodiment, the first cell belonging to the first TAG is used to determine that the first TAG comprises the first resource group and the second resource group.

In one subembodiment, the first TAG comprises the first cell.

In one subembodiment, the third signaling configures an index of the first TAG for the first cell.

In one subembodiment, the third signaling configuring an index of the first TAG for the first cell is used to determine that the first TAG comprises the first resource group and the second resource group.

In one subembodiment, if the first TAG comprises a first cell and a second cell, a resource group in the first cell and a resource group in the second cell share a same TA; the second cell is a cell in the first TAG other than the first cell.

In one embodiment, any TAG in the target TAG set does not comprise the second resource group.

In one subembodiment, the second resource group is not configured with an index of any TAG.

In one subembodiment, the second resource group does not belong to any TAG in the target TAG set.

In one subembodiment, the third signaling does not configure an index of the first TAG for the second resource group.

In one embodiment, the third signaling is used for configuring an index of a TAG in the target TAG set for each cell in the first cell group.

In one embodiment, the third signaling is used for configuring an index of a TAG in the target TAG set for a cell in the first cell group or a resource group in a cell.

In one embodiment, the third signaling is used for configuring an index of a TAG in the target TAG set for a resource group in each cell in the first cell group.

In one subembodiment, the resource group is a reference resource group in each cell.

In one subembodiment, the reference resource group is a resource group of which a reference resource group with an index equal to 0 or 1.

In one subembodiment, the reference resource group is a resource group of which a reference resource group is pre-defined.

In one subembodiment, the reference resource group is a resource group of which a reference resource group is indicated.

In one subembodiment, the resource group is any resource group in each cell.

In one embodiment, the third signaling is received before the first signaling is received.

In one embodiment, the third signaling is received before the second signaling is received.

In one embodiment, a transmitter of the third signaling is a maintenance base station for the first cell.

In one embodiment, a transmitter of the third signaling is a maintenance base station for a serving cell of the first node U01.

In one embodiment, a transmitter of the third signaling is a maintenance base station for the first cell.

In one embodiment, a transmitter of the third signaling is a maintenance base station for a cell in the first cell group.

In one embodiment, a transmitter of the third signaling is a maintenance base station for an additional cell of a serving cell of the first node U01.

In one embodiment, the third signaling comprises at least one RRC Message.

In one embodiment, the third signaling comprise at least one RRC Field in an RRC message.

In one embodiment, the third signaling comprise at least one RRC Information Element (IE) in an RRC message.

In one embodiment, the third signaling comprises a Downlink (DL) message.

In one embodiment, the third signaling comprises a Side-link (SL) message.

In one embodiment, the third signaling is transmitted through a DCCH.

In one embodiment, the third signaling comprises a RRCReconfiguration message.

In one embodiment, the third signaling belongs to a RRCReconfiguration message.

In one embodiment, the third signaling comprises a ServingCellConfigCommon IE.

In one embodiment, the third signaling comprises a CellGroupConfig IE.

In one embodiment, the third signaling comprises a ServingCellConfig IE.

In one embodiment, the third signaling comprises at least a ServingCellConfig IE, the ServingCellConfig IE belongs to SpCellConfig or the ServingCellConfig IE belonging to SCellConfig.

In one embodiment, a field in the third signaling indicates an index of a first TAG.

In one embodiment, the third signaling is used for configuring the target TAG set.

In one embodiment, the third signaling is used for configuring at least one TAG in the target TAG set.

In one embodiment, the third signaling is used for configuring all TAGs in the target TAG set.

In one embodiment, the third signaling is used for configuring a resource group in each TAG in the target TAG set.

In one embodiment, the third signaling is used for configuring a resource group comprised in each TAG in the target TAG set.

In one embodiment, the target TAG set belongs to the first cell group.

In one embodiment, the target TAG set is for the first cell group.

In one embodiment, any cell in any TAG in the target TAG set belongs to the first cell group.

In one embodiment, any resource group in any TAG in the target TAG set belongs to the first cell group.

In one embodiment, any resource group or any cell in any TAG in the target TAG set belongs to the first cell group.

In one embodiment, a resource group is associated with one cell.

In one embodiment, a resource group belongs to one cell.

In one embodiment, a resource group belongs to a TRP in one cell.

In one embodiment, a number of TAG(s) comprised in the target TAG set is configurable.

In one embodiment, a number of TAG(s) comprised in the target TAG set is fixed.

In one embodiment, the target TAG set comprises at least one TAG.

In one embodiment, the target TAG set comprises 4 TAGs.

In one embodiment, the target TAG set comprises 8 TAGs.

In one embodiment, the target TAG set comprises at most 4 TAGs.

In one embodiment, the target TAG set comprises at most 8 TAGs.

In one embodiment, the first resource group is configured with an index of the first TAG.

In one embodiment, the third signaling configures an index of the first TAG for the first resource group.

In one embodiment, the third signaling comprises an index of the first resource group, and, the third signaling comprises an index of the first TAG, where an index of the first resource group and an index of the first TAG belong to a same RRC field.

Embodiment 8

Figure 8:
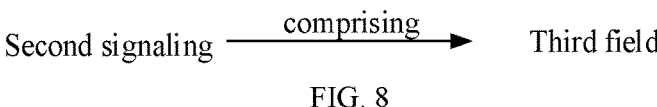
FIG. 8 illustrates a schematic diagram of an uplink transmission timing of a second resource group being unrelated to a first TA according to one embodiment of the present application.

Embodiment 8 illustrates a schematic diagram of an uplink transmission timing of a second resource group being unrelated to a first TA according to one embodiment of the present application, as shown in FIG. 8.

In Embodiment 8, the action of determining an uplink transmission timing for a second resource group according to at least the second TA comprises: determining an uplink transmission timing for a second resource group according to at least the second TA; an uplink transmission timing for the second resource group is unrelated to the first TA.

In one embodiment, the second TA is related to the second TA and the second value.

In one embodiment, the second TA is related to the second TA, the second value and the second maintenance $N_{TA}$.

In one embodiment, the second TA=the second $T_A$·second value.

In one embodiment, the second TA=second maintenance $N_{TA}$+(the second $T_A$-W1) second value.

In one embodiment, a time interval by which the first uplink frame is in advance of the first reference downlink frame is equal to the first $T_{TA}$, while a time interval by which the second uplink frame is in advance of the first reference downlink frame is equal to the second $T_{TA}$.

In one embodiment, the second reference downlink frame in the present application is the first reference downlink frame.

In one embodiment, the first resource group and the second resource group belong to a same TAG.

In one embodiment, the first resource group and the second resource group belong to different TAGs.

In one embodiment, the first signaling and the second signaling belong to a same MAC CE.

In one embodiment, the first signaling and the second signaling belong to a same Random Access Response (RAR).

Embodiment 9

Figure 9:
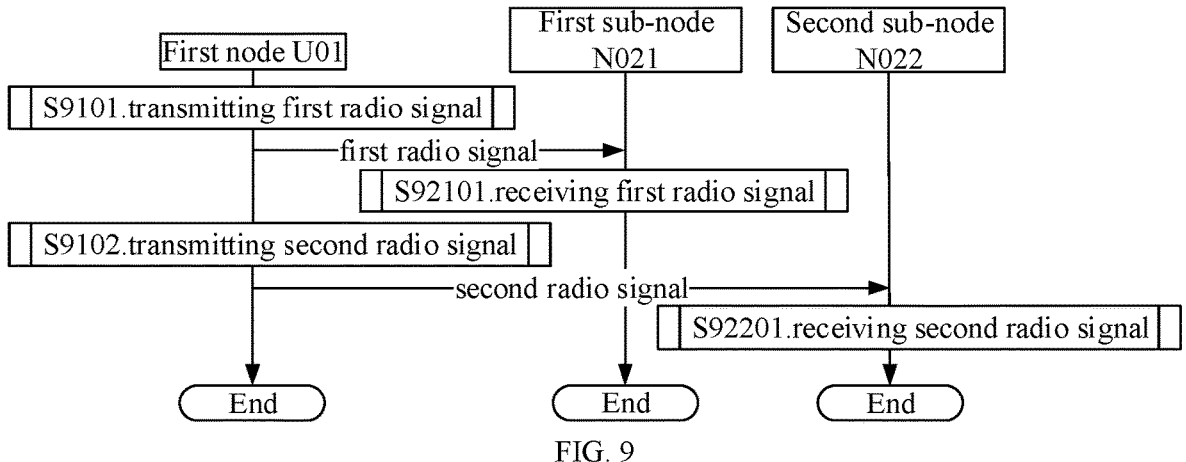
FIG. 9 illustrates a flowchart of radio signal transmission according to a fourth embodiment of the present application.

Embodiment 9 illustrates a flowchart of signal transmission according to a fourth embodiment of the present application, as shown in FIG. 9. It should be particularly noted that the sequence illustrated herein does not set any limit to the signal transmission order or implementation order in the present application.

The first node U01 transmits a first radio signal according to an uplink transmission timing for the first resource group in step S9101; and transmits a second radio signal according to an uplink transmission timing for the second resource group in step S9102.

The first sub-node N021 receives the first radio signal in step S92101.

The second sub-node N022 receives the second signal in step S92201.

In Embodiment 9, the first radio signal is a physical layer signal; the second radio signal is a physical layer signal.

In one embodiment, the first sub-node N021 and the second sub-node N022 are associated with the second node in the present application.

In one embodiment, the first sub-node N021 and the second sub-node N022 are respectively two TRPs in the second node in the present application.

In one embodiment, the first resource group is associated with the first sub-node N021, while the second resource group is associated with the second sub-node N022.

In one embodiment, the first sub-node N021 and the second sub-node N022 both belong to the first cell.

In one embodiment, the first sub-node N021 and the second sub-node N022 are respectively two TRPs in the first cell.

In one embodiment, the first sub-node N021 belongs to the first cell, while the second sub-node N022 belongs to an additional cell of the first cell.

In one embodiment, the first radio signal is associated with the first resource group, while the second radio signal is associated with the second resource group.

In one embodiment, the step S9101 is taken before the step S9102.

In one embodiment, the step S9101 is taken after the step S9102.

Embodiment 10

Figure 10:
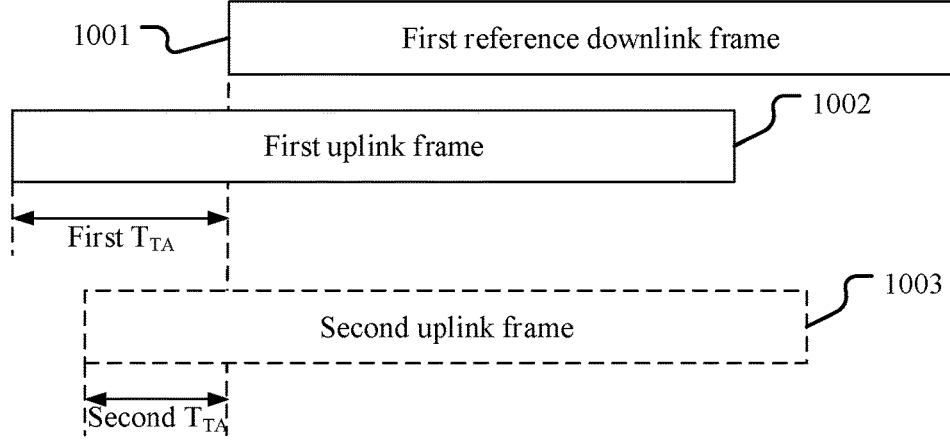
FIG. 10 illustrates a schematic diagram illustrating a timing relation between an uplink and a downlink according to one embodiment of the present application.

Embodiment 10 illustrates a schematic diagram illustrating a timing relation between an uplink and a downlink according to one embodiment of the present application, as shown in FIG. 10. In FIG. 10, the box 1001 represents a first reference downlink frame, the box 1002 represents a first uplink frame, and the box 1003 represents a second uplink frame; it should be particularly noted that the FIG. 10 does not restrict the sequential order of the start time of a first uplink frame and the start time of the second uplink frame.

In Embodiment 10, a time interval by which the first uplink frame is in advance of the first reference downlink frame is equal to the first $T_{TA}$, while a time interval by which the second uplink frame is in advance of the first reference downlink frame is equal to the second $T_{TA}$.

In one embodiment, the second reference downlink frame in the present application is the first reference downlink frame.

In one embodiment, the first uplink frame, the second uplink frame and the first reference downlink frame have equal lengths.

In one embodiment, a start time of the first uplink frame is earlier than a start time of the second uplink frame, where the first $T_{TA}$ is larger than the second $T_{TA}$.

In one embodiment, a start time of the first uplink frame is later than a start time of the second uplink frame, where the first $T_{TA}$ is smaller than the second $T_{TA}$.

In one embodiment, a start time of the first uplink frame is the same as a start time of the second uplink frame, where the first $T_{TA}$ is equal to the second $T_{TA}$.

In one embodiment, a start time of the second uplink frame is deferred by (the first $T_{TA}$–the second $T_{TA}$) compared with a start time of the first uplink frame.

In one embodiment, a start time of the second uplink frame is advanced by (the second $T_{TA}$–the first $T_{TA}$) compared with a start time of the first uplink frame.

Embodiment 11

Figure 11:
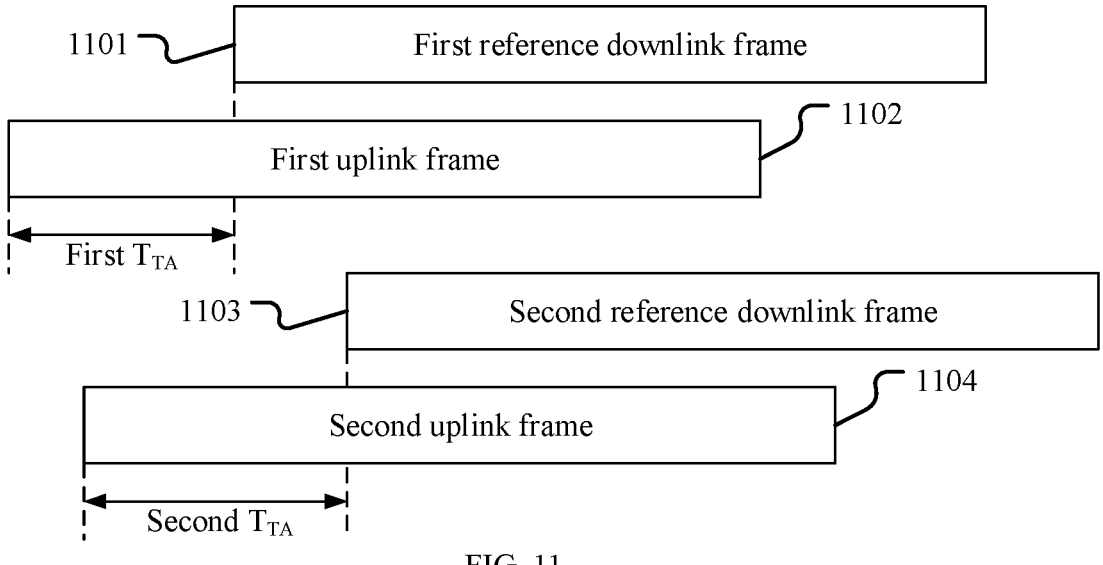
FIG. 11 illustrates a schematic diagram illustrating a timing relation between an uplink and a downlink according to another embodiment of the present application.

Embodiment 11 illustrates a schematic diagram illustrating a timing relation between an uplink and a downlink according to another embodiment of the present application, as shown in FIG. 11. In FIG. 11, the box 1101 represents a first reference downlink frame, the box 1102 represents a first uplink frame, the box 1103 represents a second reference downlink frame, and the box 1104 represents a second uplink frame; What should be particularly noted is that the FIG. 11 does not restrict the order between the start time of the first uplink frame and the start time of the second uplink frame, and nor does it restrict the order of the start time of the first reference downlink frame and the start time of the second reference downlink frame.

In Embodiment 11, a time interval by which the first uplink frame is in advance of the first reference downlink frame is equal to the first $T_{TA}$, while a time interval by which the second uplink frame is in advance of the second reference downlink frame is equal to the second $T_{TA}$.

In one embodiment, the first reference downlink frame and the second reference downlink frame are different.

In one embodiment, the first uplink frame, the second uplink frame, the first reference downlink frame and the second reference downlink frame have equal lengths.

In one embodiment, a start time of the first reference downlink frame is earlier than a start time of the second reference downlink frame.

In one embodiment, a start time of the first reference downlink frame is later than a start time of the second reference downlink frame.

In one embodiment, a start time of the first reference downlink frame is the same as a start time of the second reference downlink frame.

Embodiment 12

Figure 12:
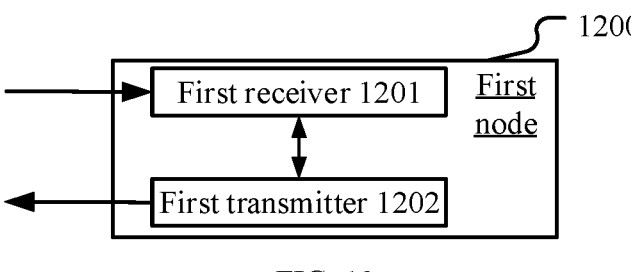
FIG. 12 illustrates a structure block diagram of a processing device used in a first node according to one embodiment of the present application.

Embodiment 12 illustrates a structure block diagram of a processing device used in a first node according to one embodiment of the present application; as shown in FIG. 12. In FIG. 12, a processing device 1200 in a first node is comprised of a first receiver 1201 and a first transmitter 1202.

The first receiver 1201 receives a first signaling, the first signaling being used to determine a first Timing Advance (TA); and receives a second signaling, the second signaling being used to determine a second TA; and the first transmitter 1202, as a response to the first signaling being received, determines an uplink transmission timing for a first resource group according to at least the first TA, and starts or restarts a first timer, where a running status of the first timer is used to determine whether uplinks associated with the first resource group are aligned; and as a response to the second signaling being received, determines an uplink transmission timing for a second resource group according to at least the first TA and the second TA.

In Embodiment 12, the first resource group and the second resource group are both associated with a first cell; the first resource group comprises at least one radio resource; the second resource group comprises at least one radio resource; any radio resource in the first resource group is different from any radio resource in the second resource group.

In one embodiment, the second signaling comprises a first field, the first field being used to indicate the first cell.

In one embodiment, the second signaling comprises a second field, the second field being used to indicate the second resource group.

In one embodiment, the second signaling comprises a third field, the third field being used to determine whether the second TA is a positive number or a negative number.

In one embodiment, the first receiver 1201 receives a third signaling, the third signaling being used to determine a target TAG set, the target TAG set comprising at least one TAG, where a first TAG is one TAG comprised in the target TAG set; herein, the first TAG comprises the first resource group; the first TAG comprises the second resource group, or, any TAG in the target TAG set does not comprise the second resource group.

In one embodiment, the first transmitter 1202 executes a first action set as a response to the first timer being expired; herein, the first action set comprises at least one of flushing all HARQ buffers associated with the first cell, or, notifying a higher layer of releasing all first-type resources associated with the first cell, or, deleting all second-type resources associated with the first cell; the first-type resource comprises at least one of a PUCCH or an SRS; the second-type resource comprises at least one of a configured downlink assignment or a configured uplink grant or a PUSCH resource of a semi-persistent CSI reporting.

In one embodiment, the first transmitter 1202, as a response to the second signaling being received, starts or restarts the first timer.

In one embodiment, the first transmitter 1202 transmits at least a first radio signal according to an uplink transmission timing for the first resource group, where the first radio signal is a physical layer signal.

In one embodiment, the first transmitter 1202 transmits at least a second radio signal according to an uplink transmission timing for the second resource group, where the second radio signal is a physical layer signal.

In one embodiment, the first receiver 1201 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1201 comprises the antenna 452, the receiver 454, the multi-antenna receiving processor 458 and the receiving processor 456 in FIG. 4 of the present application.

In one embodiment, the first receiver 1201 comprises the antenna 452, the receiver 454 and the receiving processor 456 in FIG. 4 of the present application.

In one embodiment, the first transmitter 1202 comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1202 comprises the antenna 452, the transmitter 454, the multi-antenna transmitting processor 457 and the transmitting processor 468 in FIG. 4 of the present application.

In one embodiment, the first transmitter 1202 comprises the antenna 452, the transmitter 454 and the transmitting processor 468 in FIG. 4 of the present application.

Embodiment 13

Figure 13:
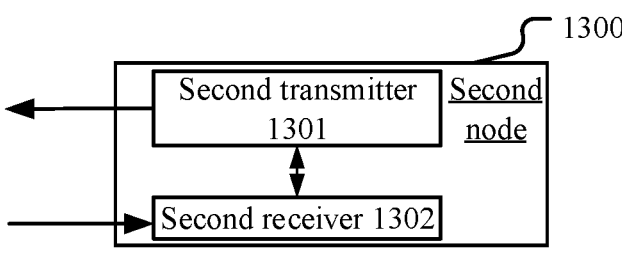
FIG. 13 illustrates a structure block diagram of a processing device used in a second node according to one embodiment of the present application.

Embodiment 13 illustrates a structure block diagram of a processing device used in a second node according to one embodiment of the present application; as shown in FIG. 13. In FIG. 13, a processing device 1300 in a second node is comprised of a second transmitter 1301 and a second receiver 1302.

The second transmitter 1301 transmits a first signaling, the first signaling being used to determine a first TA, and at least the first TA being used to determine an uplink transmission timing for a first resource group; and transmits a second signaling, the second signaling being used to determine a second TA, and at least the first TA and the second TA being used to determine an uplink transmission timing for a second resource group.

In Embodiment 13, as a response to the first signaling being received, a first timer is started or restarted, and a running status of the first timer is used to determine whether uplinks associated with the first resource group are aligned; the first resource group and the second resource group are both associated with a first cell; the first resource group comprises at least one radio resource; the second resource group comprises at least one radio resource; any radio resource in the first resource group is different from any radio resource in the second resource group.

In one embodiment, the second signaling comprises a first field, the first field being used to indicate the first cell.

In one embodiment, the second signaling comprises a second field, the second field being used to indicate the second resource group.

In one embodiment, the second signaling comprises a third field, the third field being used to determine whether the second TA is a positive number or a negative number.

In one embodiment, the second transmitter 1301 transmits a third signaling, the third signaling being used to determine a target TAG set, the target TAG set comprising at least one TAG, where a first TAG is one TAG comprised in the target TAG set; herein, the first TAG comprises the first resource group; the first TAG comprises the second resource group, or, any TAG in the target TAG set does not comprise the second resource group.

In one embodiment, as a response to the first timer being expired, a first action set is executed; herein, the first action set comprises at least one of flushing all HARQ buffers associated with the first cell, or, notifying a higher layer of releasing all first-type resources associated with the first cell, or, deleting all second-type resources associated with the first cell; the first-type resource comprises at least one of a PUCCH or an SRS; the second-type resource comprises at least one of a configured downlink assignment or a configured uplink grant or a PUSCH resource of a semi-persistent CSI reporting.

In one embodiment, as a response to the second signaling being received, the first timer is started or restarted.

In one embodiment, the second receiver 1302 receives at least a first radio signal, the first radio signal being a physical layer signal, and the first radio signal being transmitted according to an uplink transmission timing for the first resource group.

In one embodiment, the second receiver 1302 receives at least a second radio signal, the second radio signal being a physical layer signal, and the second radio signal being transmitted according to an uplink transmission timing for the second resource group.

In one embodiment, the second transmitter 1301 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1301 comprises the antenna 420, the transmitter 418, the multi-antenna transmitting processor 471 and the transmitting processor 416 in FIG. 4 of the present application.

In one embodiment, the second transmitter 1301 comprises the antenna 420, the transmitter 418 and the transmitting processor 416 in FIG. 4 of the present application.

In one embodiment, the second receiver 1302 comprises the antenna 420, the receiver 418, the multi-antenna receiving processor 472, the receiving processor 470, the controller/processor 475 and the memory 476 in FIG. 4 of the present application.

In one embodiment, the second receiver 1302 comprises the antenna 420, the receiver 418, the multi-antenna receiving processor 472 and the receiving processor 470 in FIG. 4 of the present application.

In one embodiment, the second receiver 1302 comprises the antenna 420, the receiver 418 and the receiving processor 470 in FIG. 4 of the present application.

Embodiment 14

Figure 14:
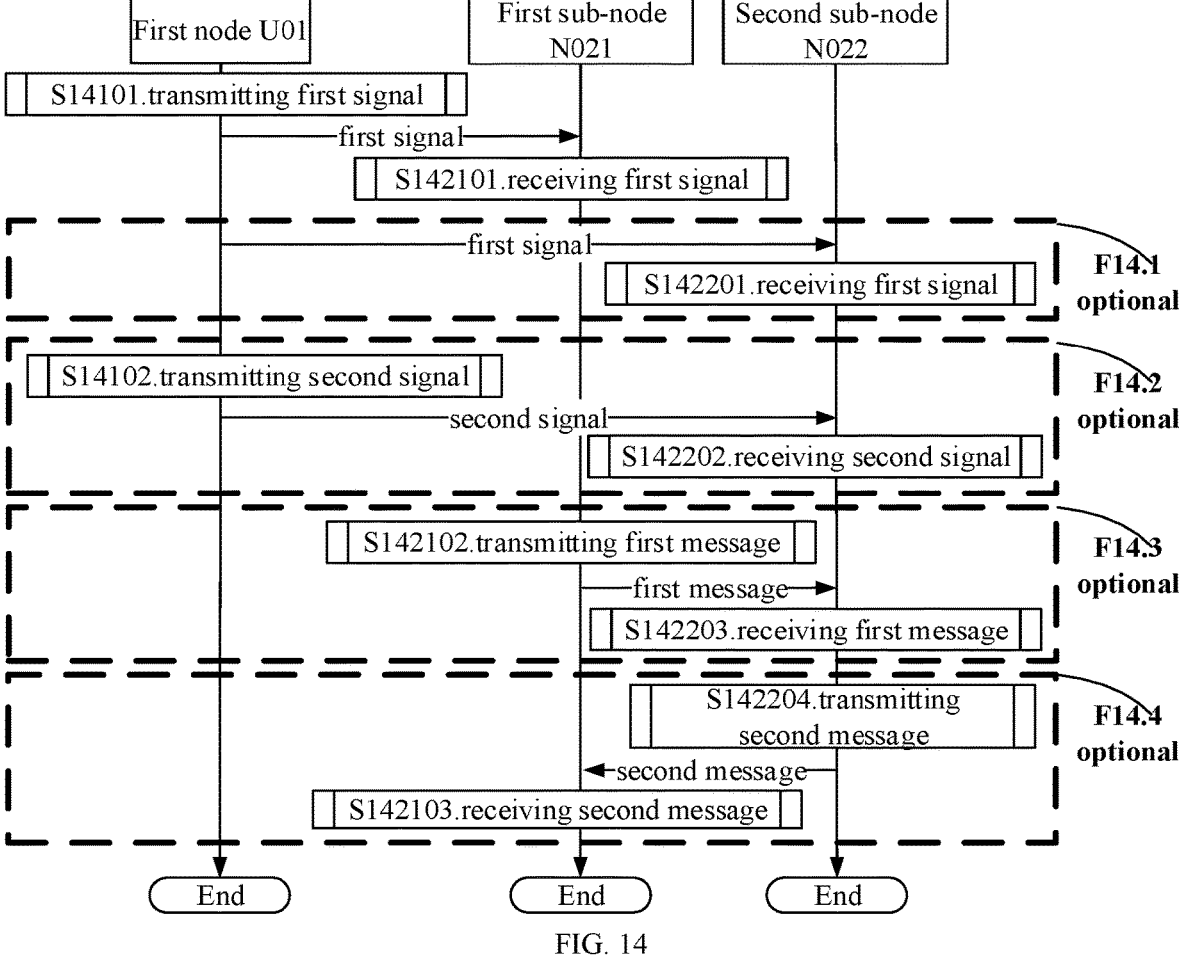
FIG. 14 illustrates a flowchart of radio signal transmission according to a fifth embodiment of the present application.

Embodiment 14 illustrates a flowchart of radio signal transmission according to a fifth embodiment of the present application, as shown in FIG. 14. It should be particularly noted that the sequence illustrated herein does not set any limit to the signal transmission order or implementation order in the present application.

The first node U01 transmits a first signal in step S14101; and transmits a second signal in step S14102; receives a first signaling in step S14103; and receives a second signaling in step S14104.

The first sub-node N021 receives the first signal in step S142101; transmits the first message in step S142102; and receives the second message in step S142103.

The second sub-node N022 receives the first signal in step S142201; and receives the second signal in step S142202; receives the first message in step S142203; and transmits the second message in step S142204.

In Embodiment 14, the first signal is a physical layer signal; the first signal is used by the first sub-node N021 for calculating the first TA.

In one embodiment, the first signal is an uplink signal.

In one embodiment, the first signal is a PRACH signal.

In one embodiment, the first signal is a PUCCH signal.

In one embodiment, the first signal is an SRS signal.

In one embodiment, the first signal is a PUSCH signal.

In one embodiment, the second signal is a PRACH signal.

In one embodiment, the second signal is a PUCCH signal.

In one embodiment, the second signal is an SRS signal.

In one embodiment, the second signal is a PUSCH signal.

In one embodiment, the first signal triggers the first signaling.

In one embodiment, the first signal triggers the second signaling.

In one embodiment, the second signal triggers the second signaling.

In one embodiment, the first message triggers the second signaling.

In one embodiment, the second message triggers the second signaling.

In one embodiment, the dotted-line box F14.1 is optional.

In one embodiment, the dotted-line box F14.2 is optional.

In one embodiment, the dotted-line box F14.3 is optional.

In one embodiment, the dotted-line box F14.4 is optional.

In one embodiment, the dotted-line box F14.1 exists, and the dotted-line box F14.2 does not exist.

In one embodiment, the first signal is used by the second sub-node N022 for calculating the second TA.

In one embodiment, the dotted-line box F14.2 exists, and the dotted-line box F14.1 does not exist.

In one embodiment, the second signal is a physical layer signal; the second signal is used by the second sub-node N022 for calculating the second TA.

In one embodiment, the first message is transmitted via an Xn interface.

In one embodiment, the first message is transmitted via an X2 interface.

In one embodiment, the first message is transmitted via a backhaul link.

In one embodiment, the first message is used for calculating the second TA.

In one embodiment, the first message indicates an integer, the integer being used for calculating the second TA.

In one embodiment, the first message indicates a time interval, the time interval being used for calculating the second TA.

In one embodiment, the first message indicates the first TA.

In one embodiment, the first message indicates the second TA.

In one embodiment, the second message is transmitted via an Xn interface.

In one embodiment, the second message is transmitted via an X2 interface.

In one embodiment, the second message is transmitted via a backhaul link.

In one embodiment, the second message is used for calculating the second TA.

In one embodiment, the second message indicates an integer, the integer being used for calculating the second TA.

In one embodiment, the second message indicates a time interval, the time interval being used for calculating the second TA.

In one embodiment, the second message indicates the first TA.

In one embodiment, the second message indicates the second TA.

In one embodiment, the first signal triggers the first signaling.

In one embodiment, the dotted-line box F14.3 exists, and the dotted-line box F14.4 does not exist; the first signal triggers a first message; the first message triggers the second signaling.

In one embodiment, the dotted-line box F14.3 does not exist, and the dotted-line box F14.4 exists; the second message triggers the second signaling.

In one subembodiment, the first signal triggers the second message.

In one subembodiment, the second signal triggers the second message.

In one embodiment, neither of the dotted-line box F14.3 and the dotted-line box F14.4 exists.

In one subembodiment, the first signal triggers the second signaling.

In one subembodiment, the second signal triggers the second signaling.

In one embodiment, the dotted-line box F14.3 and the dotted-line box F14.4 both exist, where the step S142102 is before the step S142103; the first message triggers the second message; the second message triggers the second signaling.

In one subembodiment, the first signal triggers the first message.

In one embodiment, the dotted-line box F14.3 and the dotted-line box F14.4 both exist, where the step S142103 is before the step S142102; the second message triggers the first message; and the first message triggers the second signaling.

In one subembodiment, the first signal triggers the second message.

In one subembodiment, the second signal triggers the second message.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:

a transceiver; and a processor, wherein the transceiver and the processor are configured to:

receive a first timing signal, determine, based on the first timing signal, a first Timing Advance (TA) value for a first resource group associated with a first cell, receive a second timing signal comprising a first field indicative of the first cell, a second field indicative of a second resource group associated with the first cell, and a third field indicative of whether a second TA value associated with the second resource group is a positive adjustment value or a negative adjustment value, determine, based on the second timing signal, the second TA value associated with the second resource group, wherein the first resource group is different from the second resource group, in response to the first timing signal, determine, based on the first TA value, an uplink transmission timing for the first resource group, in response to the first timing signal, start or restart a first timer, in response to the second timing signal, determine, based on both the first TA value and the second TA value, an uplink transmission timing for the second resource group, monitor whether the first timer is running or expired, on a condition that the first timer is running, determine that one or more uplink transmissions associated with the first resource group are aligned, on a condition that the first timer is expired, execute an action set associated with the first cell.

2. The UE of claim 1, wherein the transceiver and the processor are further configured to receive a third timing signal used to determine a target TA group (TAG) set, wherein the target TAG set comprises at least one TAG, and wherein a first TAG is one TAG comprised in the target TAG set, and wherein the first TAG comprises the first resource group, the first TAG comprises the second resource group, or, any TAG in the target TAG set does not comprise the second resource group.

3. The UE of claim 1, wherein executing the action set comprises at least one of:

flushing all HARQ buffers associated with the first cell, notifying a higher layer of releasing all first-type resources associated with the first cell, or, deleting all second-type resources associated with the first cell, wherein a first-type resource comprises at least one of a Physical Uplink Control Channel (PUCCH) or a Sounding Reference Signal (SRS), and wherein a second-type resource comprises at least one of a configured downlink assignment or a configured uplink grant or a Physical Uplink Shared Channel (PUSCH) resource of a semi-persistent Channel State Information (CSI) reporting.

4. The UE of claim 3, wherein a Hybrid Automatic Repeat Request (HARQ) buffer corresponds to a HARQ process, the HARQ process being associated with a resource group in the first cell.

5. The UE of claim 4, wherein a Downlink Control Information (DCI) explicitly indicates a resource group that the HARQ process is associated with, or, a DCI implicitly indicates a resource group that the HARQ process is associated with.

6. The UE of claim 1, wherein the transceiver and the processor are further configured to:

start or restart the first timer in response to the second timing signal.

7. The UE of first node according to claim 1, wherein the transceiver and the processor are further configured to transmit a first signal, wherein:

the first signal is a physical layer signal, the first signal is used by a first sub-node associated with a base station for calculating the first TA value, the first signal triggers the first timing signal, or, the first signal triggers the second timing signal.

8. The UE of claim 7, wherein the transceiver and the processor are configured to transmit a second signal, wherein:

the second signal is a physical layer signal, the second signal is used by a second sub-node associated with the base station for calculating the second TA value, or the second signal triggers the second timing signal.

9. The UE of claim 1, wherein the first timing signal comprises a first Medium Access Control (MAC) field used to determine the first TA value and a second MAC field indicating an index of a TAG to which the first resource group belongs.

10. The UE of claim 1, wherein the second TA value is an adjustment value for a reference TA value associated with at least one of: the first resource group, or the second resource group.

11. The UE of claim 1, wherein the second timing signal comprises a given field used to determine the second TA value and a third MAC field indicating an index of a TAG to which the second resource group belongs.

12. A base station comprising:

a transceiver; and a processor, wherein the transceiver and the processor are configured to:

transmit a first timing signal, the first timing signal being used to determine a first Timing Advance (TA) value, and at least the first TA value being used to determine an uplink transmission timing for a first resource group, and transmit a second timing signal, the second timing signal being used to determine a second TA value, and both the first TA value and the second TA value being used to determine an uplink transmission timing for a second resource group, wherein as a response to the first timing signal being received, a first timer is started or restarted, and a running status of the first timer is used to determine whether one or more uplinks associated with the first resource group are aligned or to execute an action set associated with a first cell, and wherein the first resource group and the second resource group are both associated with the first cell, and wherein the first resource group is different from the second resource group.

13. The base station of claim 12, comprising:

a first sub-node configured to receive a first signal and transmit a first message; and a second sub-node configured to receive the first message, wherein the first signal triggers the first message; and wherein the first sub-node and the second sub-node are associated with the base station.

14. The base station of claim 13, wherein the first message triggers the second timing signal.

15. The base station of claim 13, wherein the second sub-node is configured to transmit a second message, and wherein the first sub-node is configured to receive the second message, and wherein:

the first message triggers the second message, the second message indicates the second TA value, and the second message triggers the second timing signal.

16. The base station of claim 12, comprising:

a second sub-node configured to receive a first signal, or, receive a second signal, and transmit a second message, wherein:

wherein the first signal triggers the second message, the second signal triggers the second message, the second message indicates the second TA value, or the second message triggers the second timing signal.

17. A method performed by a user equipment (UE), the method comprising:

receiving a first timing signal;

determining, based on the first timing signal, a first Timing Advance (TA) value for a first resource group associated with a first cell;

receiving a second timing signal comprising a first field indicative of the first cell, a second field indicative of a second resource group associated with the first cell, and a third field indicative of whether a second TA value associated with the second resource group is a positive adjustment value or a negative adjustment value;

determining, based on the second timing signal, a second TA value associated with the second resource group, wherein the first resource group is different from the second resource group;

in response to the first timing signal, determining, based on the first TA value, an uplink transmission timing for the first resource group;

in response to the first timing signal, starting or restarting a first timer;

in response to the second timing signal, determining, based on both the first TA value and the second TA value, an uplink transmission timing for the second resource group;

monitoring whether the first timer is running or expired;

on a condition that the first timer is running, determining that one or more uplink transmissions associated with the first resource group are aligned; and on a condition that the first timer is expired, executing an action set associated with the first cell.

* * * * *